United States Patent
Hoshino

(10) Patent No.: US 9,239,962 B2
(45) Date of Patent: Jan. 19, 2016

(54) NAIL REGION DETECTION METHOD, PROGRAM, STORAGE MEDIUM, AND NAIL REGION DETECTION DEVICE

(76) Inventor: Kiyoshi Hoshino, Tsukuba (JP)

( * ) Notice: Subject to any disclaimer, the term of this patent is extended or adjusted under 35 U.S.C. 154(b) by 177 days.

(21) Appl. No.: 14/004,752

(22) PCT Filed: Mar. 13, 2012

(86) PCT No.: PCT/JP2012/056403
§ 371 (c)(1),
(2), (4) Date: Sep. 12, 2013

(87) PCT Pub. No.: WO2012/124686
PCT Pub. Date: Sep. 20, 2012

(65) Prior Publication Data
US 2014/0003665 A1    Jan. 2, 2014

(30) Foreign Application Priority Data
Mar. 14, 2011  (JP) .................. 2011-055889

(51) Int. Cl.
*G06K 9/00* (2006.01)
*G06K 9/32* (2006.01)
*G06T 7/00* (2006.01)
*G06T 7/40* (2006.01)
*G06K 9/46* (2006.01)

(52) U.S. Cl.
CPC .......... *G06K 9/3241* (2013.01); *G06K 9/00375* (2013.01); *G06K 9/4652* (2013.01); *G06T 7/0042* (2013.01); *G06T 7/408* (2013.01); *G06T 2207/10024* (2013.01); *G06T 2207/20072* (2013.01)

(58) Field of Classification Search
None
See application file for complete search history.

(56) References Cited

U.S. PATENT DOCUMENTS

2009/0141295 A1    6/2009   Hayashi

FOREIGN PATENT DOCUMENTS

| JP | 951443 A | 2/1997 |
|---|---|---|
| JP | 2009135704 A | 6/2009 |
| JP | 2010231352 A | 10/2010 |

OTHER PUBLICATIONS

Hoshino et al., "Extraction of finger nail areas from hand images," IEICE Technical Report, 2011, pp. 87-90, vol. 110, No. 422.
Komi et al., "Extraction of finger nails from skin area in hand image," ITE Technical Report, Oct. 2010, pp. 21-23, vol. 34, No. 41.
Sano et al., "3D hand posture estimation using relative positions of fingernails as first-stage screening," ITE Technical Report, Mar. 2009, pp. 21-24, vol. 33, No. 17.
Tamaki et al., "3D estimation of human hand posture with wrist motions," IEICE Technical Report, Aug. 2007, pp. 59-62.
Tamaki et al. "Personalized Color System for Robust Extraction of Skin-color," TVRS.I, 2007, pp. 471-478, vol. 12, No. 4. ISR AA "Virtual VR-VR Gijutsu no Oyo Ten'yo Shintenkai."

*Primary Examiner* — Atiba O Fitzpatrick
(74) *Attorney, Agent, or Firm* — The Webb Law Firm

(57) ABSTRACT

Disclosed is a nail region detection device including: color camera; image data storage part; color specification conversion plotting part for converting captured image data from the RGB color specification system to the HLS color specification system; threshold value setting part for setting and varying a threshold value along the X axis with respect to a first plotting region; second plotting part for replotting in a two-dimensional planar second graph, plotting data items which are equal to or greater than the threshold value and detecting the physical quantity or its ratio in a second plotting region; repeat control part for repeating the processing for replotting the data items; nail determination part for determining, as a nail region, a second plotting region in which the gradient of the amount of variation in the physical quantity or its ratio is equal to or less than a predetermined value.

27 Claims, 23 Drawing Sheets

(a)

(b)

(a)

(b) $$\frac{N_s^i}{N_c^i} = par_{th}^i$$

(c) $$\frac{N_c^i}{N_s^i} = par2_{th}^i$$

NAIL REGION DETECTION METHOD, PROGRAM, STORAGE MEDIUM, AND NAIL REGION DETECTION DEVICE

CROSS-REFERENCE TO RELATED APPLICATIONS

This application is the United States national phase of International Application No. PCT/JP2012/056403 filed Mar. 13, 2012, and claims priority to Japanese Patent Application No. 2011-055889 filed Mar. 14, 2011, the disclosures of which are hereby incorporated in their entirety by reference.

TECHNICAL FIELD

The present invention relates to a nail region detection method, program, storage medium, and a nail region detection device for detecting the nail region from a hand image captured by a colour camera.

BACKGROUND ART

In recent years, gesture input, which uses hand tracking from the silhouette shape of a user's hand image captured by a colour camera, has been increasingly incorporated in products. In this context, the need for high-speed and high-accuracy three-dimensional hand pose estimation, which is a technique for detecting hand tracking, has been boosted.

On the other hand, it is desired to use three-dimensional hand pose estimation more accurately or to introduce it into application fields such as information processors and game machines to eliminate the needs for storing special body actions and poses and acquiring proficiency in operation, which have been required by conventional gesture input, and to enable intuitive operation. For instance, it is required that the technique for detecting "hand shape and pose", as well as detecting hand tracing, be used to keep pace with actions in an information processor, game machine, etc.

One of approaches for three-dimensional hand pose estimation is a two-dimensional-appearance-based technique, which compares an input image directly with an image stored in matching database using an information processing device, without extracting characteristics from the image captured by the camera. This technique allows the hand silhouette shape captured by a camera to be used for an input image; therefore, the information processor may estimate the approximate hand silhouette shape from the displayed hand shape.

Conventionally, when "hand shape and pose" are detected from an image captured by a camera, it is difficult to estimate the hand shape correctly from its silhouette shape because the hand has the following three characteristics, (a), (b), and (c):

(a) The hand shape changes complicatedly because of the hand having an articulated structure.

(b) When finger joints are flexed or the fist is clenched, the fingers are often hidden by the back and palm of the hand due to self-shadowing in the silhouette shape of the hand.

(c) Although the ratio of the hand to the whole body is small, the hand has a wide range of motion.

The inventor of the present invention added nail position information so as to estimate the "hand shape and pose" more accurately, because the "hand shape and pose" could not be accurately detected only from the silhouette shape of the hand as mentioned above (see, for instance, non-patent document 1). Moreover, the inventor of the present invention demonstrated that the efficiency of hand shape and pose estimation could be improved using the nail position information in terms of the structure of matching database, in which images for comparison directly with input images are contained (see, for instance, non-patent document 2).

CITATION LIST

Non Patent Literature

[NPL 1] Emi TAMAKI, Kiyoshi HOSHINO: "Three-dimensional estimation of the hand shape including wrist joint motions", Paper of IECE Technical Group, WIT, 107, 179, pp. 59-62, 2007.

[NPL 2] Ryosuke SANO, Motomasa TOMITA, Kiyoshi HOSHINO: "Three-dimensional hand pose estimation using relative position information on the nail for filtration", Paper of The Institute of Image Information and Television Engineers Technical Group, 33, 17, pp. 21-24, 2009.

However, a non-patent document 1 discloses that the nail position information is detected from the hand image of only one user using a given algorithm, whereas it does not verify that the nail position information can be extracted from the hand image of any type of user using the same algorithm in the same manner as that for the only one user; accordingly, the universality and reproducibility of the algorithm have not been validated. In addition, the non-patent document 1 does not describe a method for assigning the nail position information to the silhouette shape efficiently.

On the other hand, a non-patent document 2 discloses an approach to improve the efficiency of hand shape and pose estimation in terms of the structure of the matching database, and a method for determining the nail region from the skin region of the hand image is not described.

In short, any of conventional methods has not enabled the position information of the nail region to be obtained from the skin region of the hand image of any user; hence, it could not be achieved that the nail information is added to the silhouette shape information effectively and the individual nail position information are assigned to the silhouette shape information efficiently. Thus, the conventional methods could not solve a problem with difficulty in more accurate hand shape estimation.

DISCLOSURE OF INVENTION

Against this background, the object of the present invention is to provide the nail detection method, program, storage medium, and a nail region detection device, which enable the position information of the nail region to be obtained from the skin region of the hand image of the any user, and the hand shape to be estimated accurately, aiming to solve the aforementioned problem.

To solve the aforementioned problem, the nail region detection method of the present invention includes at least steps of; repeating, several times, a processing for mapping a first plotting region, in which the data items of the hand image captured by a colour camera have been plotted and converted in a three-dimensional colour spatial first graph to a two-dimensional planer second plotting region, while varying a threshold value along one axis in the three-dimensional colour space; detecting at least one physical quantity or its ratio in the two-dimensional planer plotting region in each processing; and determining, as the nail region, the second plotting region, in which the gradient of the amount of variation in physical quantity or ratio is equal to or less than a predetermined value in each processing.

DETAILED DESCRIPTION OF INVENTION

Figure 1:
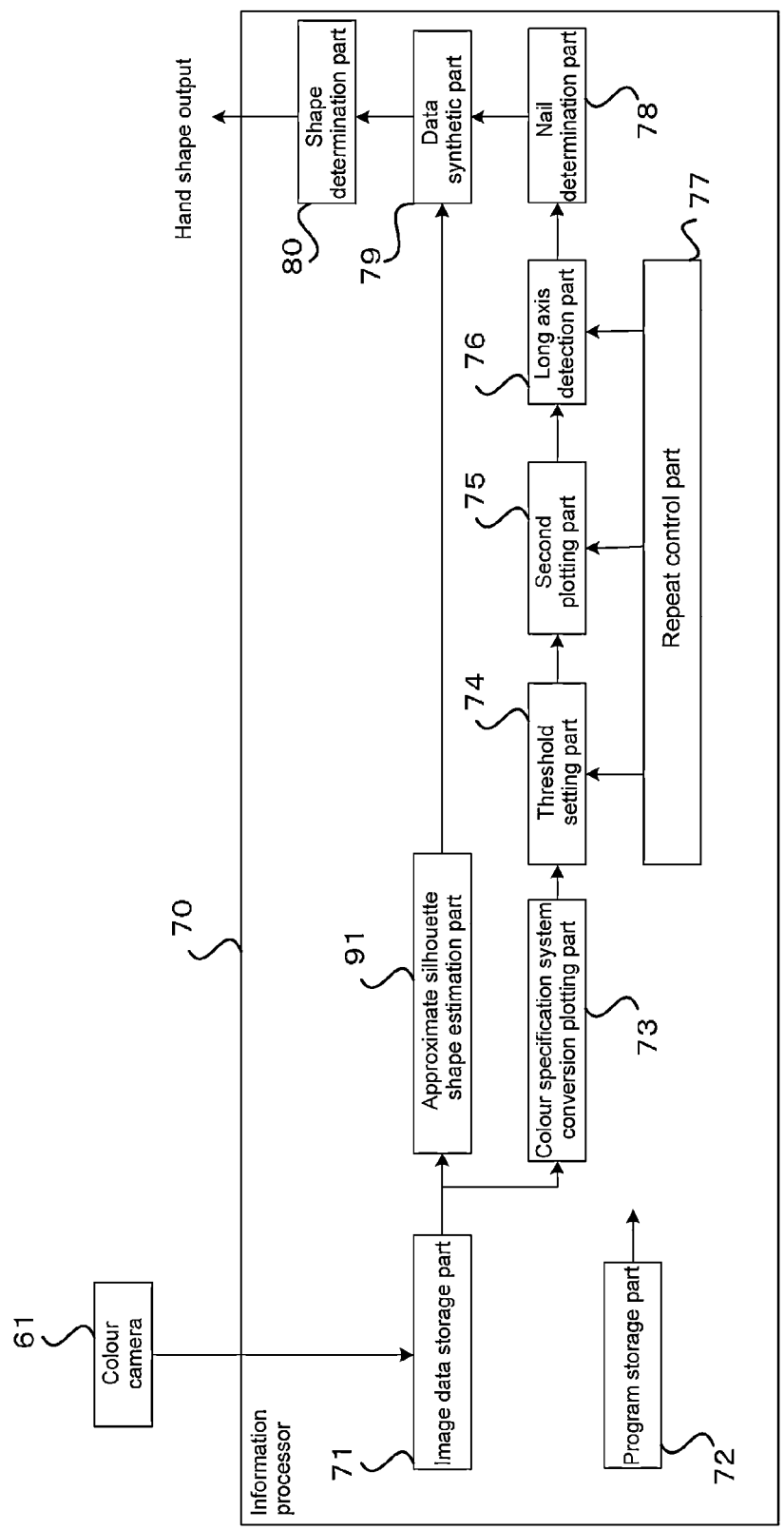
FIG. 1 is a schematic block diagram showing a hardware configuration, according to a first embodiment of the present invention.

General Description (1) The nail detection method of the present invention includes at least the steps of: repeating, several times, a process of mapping a first plotting region, which is the data items on the hand image captured by a colour camera plotted and converted in a three-dimensional colour spatial first graph, to a two-dimensional planer second plotting region while varying a threshold value along one axis in the three-dimensional colour space; detecting at least one physical quantity or its ratio in the two-dimensional planer plotting region, in each processing; and determining, as the nail region, the second plotting region, in which the gradient of the amount of variation in physical quantity or its ratio is equal to or less than a predetermined value, in each processing.

According to the nail region detection method of the present invention, since the second plotting region is determined as the nail region, when the first plotting region in the three-dimensional colour space is mapped to the two-dimensional plane using the gradient of variation in physical quantity or its ratio in the second plotting region, which is obtained with the threshold value varied, the nail region can be reliably determined based on the hand image and the nail position can be easily assigned to the hand silhouette shape, thereby making hand shape estimation more accurate.

(2) The nail region detection method of the present invention includes: a first step of converting the data items on the image containing the user's hand captured by a colour camera from the colour specification system used by the colour camera to a predetermined colour specification system, different from the colour specification system used by the colour camera, in which the data items on the image is rendered along three axes for three different kinds of physical quantities, and plotting the converted data items on the image in the three-dimensional color spatial first graph; a second step of setting the threshold valve in line with the value along one of the three axes and parallel to other axes in more than one first plotting regions, in which the data items have been converted and plotted in the predetermined colour specification system; a third step of replotting only the plotting data items equal to or greater than the threshold value along one axis in the first plotting region in a two-dimensional planar second graph to form a second plotting region; a fourth step of detecting at least one physical quantity or its ratio in a plurality of second plotting regions in the second graph; a fifth step of repeating the third and fourth steps while varying the threshold value in the second step along the one axis in the direction traversing the first plotting region; and a sixth step of detecting the amount of variation in physical quantity or its ratio in the second plotting region obtained for each threshold value in the step 5, and determining, as the nail region, the second plotting region, in which the gradient of the amount of variation in physical quantity or its ration is equal to or less than a predetermined value.

In the nail region detection method of the present invention, from the first plotting data created by converting the data items on the image to the predetermined colour specification system in the first step; while varying the threshold value set in the second step in the fifth step, the physical quantity or its ratio in the second plotting region in which the data items equal to or greater than the threshold value are replotted in the third step are detected in the fourth step; and the second plotting region in which the gradient of the amount of variation in physical quantity or its ratio is smaller (for instance, smallest among) than those of other regions is determined as the nail region in the sixth step. The nail region detection method of the present invention allows the nail region to be recognized more accurately than conventional methods because it determines whether the plotting region is the nail region or not, using the physical quantity or its ratio in the plotting region, in which the data items have been converted to the predetermined colour specification system.

(3) The first step of the nail region detection method of the present invention may include a step of performing a predetermined pre-processing including at least external edge removal and shadow influence removal, and a step of detecting, as the first plotting region, the skin region containing a nail candidate hue pixel region, which is analogous to the hue of the nail.

In the first step of the nail detection method of the present invention, the external edges, on which fine noises are prone to generate, can be removed from the image by deleting several pixels inward from the outermost contour of the captured image in the pre-processing; alternatively, the shadow influence can be alleviated by performing γ correction in the local area determined based on an eight-bit value for red.

(4) In the fourth and sixth steps of the nail detection method of the present invention, the physical quantity or its ratio in the second plotting region may be set to the length size along at least one axis.

The nail region of the hand image can be easily detected, which, in turn, enables easy hand shape estimation by detecting, several times, the length size along one axis in the second plotting region while varying the threshold value, and determining, as the nail region, the second plotting region, in which the gradient of the amount of variation in length size along the axis is less than those of other regions.

(5) In the fourth and sixth steps of the nail region detection method of the present invention, the length size along the axis may be the length size along the long axis, which is the maximum size.

By setting the length size along the axis to the length size along the long axis, the nail region of the hand image can be more easily detected, which, in turn, enables easier hand shape estimation.

(6) In the fourth and sixth steps of the nail region detection method of the present invention, the physical quantity or its ratio in the second plotting region may be an area.

(7) In the fourth and sixth steps of the nail region detection method of the present invention, the area in the second plotting region may be the area of a dense region image with dense pixels after a processing for smoothing the second plotting region.

(8) In the fourth and sixth steps of the nail region detection method of the present invention, the area in the second plotting region may be the area of a coarse region obtained by removing the dense region with dense pixels, after the processing for smoothing the second plotting region, from the second plotting region using exclusive OR operation.

(9) In the fourth and sixth steps of the nail region detection method of the present invention, the ratio between the physical quantities in the second plotting region may be the ratio between the area of the dense region image with dense pixels after the processing for smoothing the second plotting region, and the area of the coarse region obtained by removing the dense region from the second plotting region.

The nail region of the hand image can be easily detected, which, in turn, enables easy hand shape estimation by detecting, several times, the area in the second plotting region while varying the threshold value, and determining, as the nail region, the second plotting region, in which at least any one of the gradient of the amount of variation in area, the gradient of the amount of the area of the dense region, and the gradient of the amount of variation in ratio between the area of the dense region image and the area of the coarse region is less than those of other regions.

(10) In the fourth and sixth steps of the nail region detection method of the present invention, the physical quantity or its ratio may be the number of pixels.

(11) In the fourth and sixth steps of the nail region detection method of the present invention, the number of pixels in the second plotting region may be the number of pixels of the dense region image with dense pixels after the processing for smoothing the second plotting region.

(12) In the fourth and sixth steps of the nail region detection method of the present invention, the number of pixels in the second plotting region may be the number of pixels in the coarse region obtained by removing the dense region with dense pixels after the processing for smoothing the second plotting region from the second plotting region using exclusive OR operation.

(13) In the fourth and sixth steps of the nail region detection method of the present invention, the ratio between the physical quantities in the second plotting region is the ratio between the number of pixels of the dense region image with dense pixels after the processing for smoothing the second plotting region, and the number of pixels of the coarse region obtained by removing the dense region from the second plotting region.

The nail region of the hand image can be easily detected, which, in turn, enables easy hand shape estimation by detecting, several times, the number of pixels in the second plotting region while varying the threshold value, and determining, as the nail region, the second plotting region, in which at least any one of the gradient of the amount of variation in number of pixels, the gradient of the amount of the number of pixels of the dense region, and the gradient of the amount of variation in ratio between the number of pixels in the dense region and the number of pixels in the coarse region is less than those of other regions.

(14) In the first step of the nail region detection method of the present invention, the three-dimensional colour spatial first graph may be the two-dimensional planar graph using two of the three axes for three kinds of physical quantities.

In the first step of the nail region detection method of the present invention, the threshold value can be easily set because the need for setting the threshold value in the skewed direction is eliminated by adopting the two-dimensional planar graph using two axes even when the colour specification system uses three kinds of physical quantities. Therefore, since the threshold value can be set automatically and modified easily, the user can visually check the threshold value on the display screen easily, which, in turn, makes easier recognition of the second plotting region and determination of the nail region.

(15) In the first step of the nail region detection method of the present invention, the predetermined colour specification system may contain at least a hue component.

In the first step of the nail region detection method of the present invention, fingers and nails can be determined more accurately than the conventional methods by incorporating the hue component in the physical quantity in the colour specification system used for nail detection.

(16) In the second step of the nail region detection method of the present invention, the one axis, along which the threshold value is set, may be a hue component.

In the second step of the nail region detection method of the present invention, the threshold value can be easily set because the need for setting the threshold value in the skewed direction is eliminated by setting the threshold value along the one axis for the a hue component and by varying it. Therefore, since the threshold value can be set automatically and modified easily, the user can visually check the threshold value on the display screen easily, which, in turn, makes easier recognition of the second plotting region and determination of the nail region.

(17) In the second step of the nail region detection method of the present invention, the initial value for the threshold value along the one axis may be set to the value on the outside of one of the maximum or minimum value by calculating at least one of the maximum and minimum values along the one axis in the first plotting region.

In the second step of the nail region detection method of the present invention, the third to sixth steps are performed by setting the initial values for the threshold value to the value (greater than) on the outside of the maximum value along the one axis in the first plotting region, or to the value (less than) on the outside of the minimum value along the one axis in the first region; thereby, all the plotting data items equal to or greater than the threshold value can be re-plotted in the second graph with no omission.

(18) In the fourth step of the nail region detection method of the present invention, the second plotting region may be defined by repeating expansion and contraction operations in the second plotting region.

In the fourth step of the nail region detection method of the present invention, the second plotting region can be easily zoned by performing expansion operation on the plotting data items sufficiently to overlap fully the individual regions corresponding to the plotting data items with the individual regions corresponding to other nearby plotting data items, and then by performing degeneration operation on the large region made of the individual overlapping regions of the plotting data items.

(19) In the fourth and sixth steps of the nail region detection method of the present invention, the ratio between the physical quantities in the second plotting region may be the ratio between the first length size along the long axis, which is the maximum length size along the axis, and the second length size along the short axis, which is the minimum length size along the axis.

In the fourth step of the nail region detection method of the present invention, when the physical quantities in a plurality of second plotting regions in the second graph are detected, instead of obtaining only the maximum length size along the long axis, by obtaining the maximum length size along the long axis, as a first size, the maximum long size along the short axis (generally, orthogonally intersecting the long axis), as a second size, and the ratio, first size/(first size+second size); and in the sixth step, by detecting the amount of variation in ratio, first size/(first size+second size), in the second plotting region obtained for each threshold value, and determining, as the nail region, the second plotting region, in which the gradient of the amount of variation is smaller than those of other regions in the sixth step, such an event can be suppressed that the direction in the coordinate system, which extends in the length direction along the long axis, cannot be detected accurately, for the reason that the direction in the coordinate system, which extends in the length direction along the long axis, changes when the shape of the second plotting region obtained for each threshold varies, the amount of variation in length size along the short axis is small, and only the amount of variation in length size along the long axis is large. Moreover, the event can be suppressed, that the direction in the coordinate system, which extends in the length direction along the long axis, cannot be detected accurately due to the shape changed during expansion and degeneration operations in the fourth step.

(20) In the fourth and sixth steps of the nail region detection method of the present invention, the ratio of the physical quantities in the second plotting region may be the ratio, the first size/(first size+second size), between the first length along the long axis, which is the maximum axial length, and the second length along the short axis, which is the minimum axial length.

In the fourth step of the nail region detection method of the present invention, when the maximum length sizes along the long axis in a plurality of second plotting regions in the second graph are detected, instead of only obtaining the maximum length size along the long axis, by obtaining the maximum length size along the long axis, as a first size; the maximum long size along the short axis, as a second size; and the ratio, first size/(first size+second size); and in the sixth step, by detecting the amount of variation in ratio, first size/(first size+second size), in the second plotting region obtained for each threshold value, and determining, as the nail region, the second plotting region, in which the gradient of the amount of variation is smaller than those of other regions, such an events can be suppressed that the direction in the coordinate system, which extends in the length direction along the long axis, cannot be detected accurately, for the reason that the direction in the coordinate system, which extends in the length direction along the long axis, changes when the shape of the second plotting region obtained for each threshold varies, the amount of variation in length size along the short axis is small, and only the amount of variation in length size along the long axis is large. Moreover, an event can be suppressed that the direction in the coordinate system, which extends in the length direction along the long axis, cannot be detected accurately due to the shape changed during expansion and degeneration operations in the fourth step.

(21) In the first step of the nail region detection method of the present invention, the predetermined colour specification system may be the HLS colour specification system composed of the hue, saturation, and luminance components.

According to this embodiment, to separate the skin and nail from the hand image, the data items on the hand image captured by the colour camera are converted from the RGB colour specification system, where R stands for red at 700 nm, G for green at 546.1 nm, and B for blue at 435.8 nm, to the HLS colour specification system using the following mathematical expression:

$$RGB \Rightarrow HLS \qquad \text{[Math. 1]}$$

$$MAX = \max(R, G, B)$$

$$MIN = \min(R, G, B)$$

$$L = (MAX + MIN)/2$$

If MAX = MIN, then:

$$S = 0$$

$$H = 0$$

If MAX ≠ MIN, then:

$$S = \begin{cases} (MAX - MIN)/(MAX + MIN) & L \leq 0.5 \\ (MAX - MIN)/(2 - MAX - MIN) & L > 0.5 \end{cases}$$

$$Cr = (MAX - R)/(MAX - MIN)$$

$$Cg = (MAX - G)/(MAX - MIN)$$

$$Cb = (MAX - B)/(MAX - MIN)$$

$$H = \begin{cases} Cb - Cg & R = MAX \\ 2 + Cr - Cb & G = MAX \\ 4 + Cg - Cr & B = MAX \end{cases}$$

$$H = 60 \times H$$

$$H = H + 360 \quad H < 0$$

Where, H is the hue component, L is the luminance component, S is the saturation component, and C is the chromatic luminocity component.

According to the nail region method of the present invention, the threshold value can be easily set along the one axis of H (hue) and easily varied using H (hue) as the physical quantity in the colour specification system used for bail detection; therefore the user can visually check the threshold value easily on the display screen, which, in turn, enables easy recognition of the second plotting region and easy determination of the nail region, by converting the image data items of the image captured by the colour camera from the RGB colour specification system to the HLS colour specification system and then plotting these data items in the two-dimensional planar graph using two axis in the HS coordinate system.

(22) The program of the present invention executes the steps of any one of the aforementioned nail detection methods.

By executing the steps of any of the aforementioned nail region detection methods using the program at an information processing part, position information on the nail region from the skin region of the hand image of any user captured by the colour camera can be obtained by the nail region detection method of the present invention using any of information processing parts.

(23) A storage part of the present invention stores the program for executing the steps of any one of the aforementioned nail region detection methods.

By storing the program of the present invention in a storage medium to provide the program with portability, a plurality of the nail detection methods of the present invention can be implemented in any of information processing parts in different locations only by moving the storage medium.

(24) A nail region detection device of the present invention is composed of at least a colour camera for capturing a colour image containing the user's hand and an information processing part for processing image data item output from the colour camera, the information processing part further including a program storage part, which has an installed program for executing the steps of any one of the aforementioned bail region detection methods and a configuration for enabling the program to be executed.

(25) The nail region detection device of the present invention is composed of: the colour camera for capturing a colour image containing the user's hand; an image data storage part for storing data items of the image containing the user's hand captured by the colour camera; a colour specification system conversion plotting part for converting the data items of the captured image from the colour specification system to the predetermined colour specification system, in which the data items are rendered based on three axes different from those of the colour specification system used by the colour camera, and then plotting the data items in a three-dimensional spatial first graph; a threshold setting part for setting a threshold value along one of the three axes and parallel to other axes with respect to more than one first plotting region, where the data converted to and plotted in the predetermined colour specification system, and then varying the threshold value in the direction traversing the first plotting region; a second plotting part for replotting only the plotting data items equal to or greater than the threshold values along the one axis in the second graph in the two-dimensional plane orthogonally intersecting the one axis at the threshold value, which is defined as a second plotting region; a detection part for at least one physical quantity or its ratio in a plurality of second plotting regions in the second graph; a repeat control part for replotting only the plotting data items equal to or greater than the threshold value in the second graph at the second plotting part, while varying the threshold value along the one axis in the direction traversing the first plotting region, and then repeating for repeating the step of detecting the physical quantities and their ratios in a plurality of second plotting regions of the second graph; and a nail determination part for detecting the amount of variation in physical quantity or its ratio in the second plotting region, which is obtained for each threshold at the repeat control part, and then determining, as a nail region, the second plotting region, for which the gradient of the amount of variation is equal to or less than the predetermined value.

In the nail region detection device, the physical quantity or its ratio in the second plotting region is detected, where replotted data items equal to or greater than the threshold value are distributed, while varying the set threshold value, from the first plotting data items of the image converted to the predetermined colour specification system, and then the second plotting region, in which the gradient of the amount of variation in physical quantity or its ratio is smaller than those of other plotting regions, is determined as a nail region. Using the gradient of the amount of variation in physical quantity or its ratio in the plotting region converted to the predetermined colour specification system to determine whether the plotting region is the nail region or not, the nail region can be recognized form the data items of the captured image more accurately than the conventional methods. Accordingly, since the position information on the nail region can be obtained from the skin region of any user's hand image, the information on individual nails can be added efficiently to silhouette shape information, which, in turn, enables more accurate hand shape estimation.

(26) The nail region detection device of the present invention include at least: a control part for repeating several times mapping of the first plotting region detecting at least one physical quantity or its ratio in the two-dimensional planar second plotting region, which is obtained by plotting and converting the data items of the hand image captured the colour camera in the three-dimensional colour spatial first graph, while varying the threshold value along the one axis in the three-dimensional colour space; and a nail determination part for determining, as the nail region, the second plotting region, for which the gradient of the amount of variation in physical quantity or its ratio is equal to or less than the predetermined value.

In the nail region detection device, the first plotting region in the three-dimensional colour space is mapped into the two-dimensional plane while the threshold value is varied to obtain the physical quantity or its ratio in the second plotting region at the control part; the second plotting region is determined as the nail region using the gradient of the amount of variation in obtained physical quantity or its ratio at the nail determination part; therefore, the nail region can be accurately determined from the hand image and the nail position information can be easily added to the hand silhouette shape information, which, in turn, enables more accurate estimation of the hand shape.

Effects of Invention

According to the nail region detection method, program, storage medium, and nail region detection device of the present invention, the nail region can be recognized from the data items on the captured image more accurately than the conventional methods; therefore, the nail region information can be obtained from the skin region of any user's hand image, the nail information can be effectively added to the silhouette shape information, and the information on the individual nail positions can be effectively assigned to the silhouette shape information, which, in turn, enables more accurate estimation of the hand shape.

DESCRIPTION OF EMBODIMENTS

Embodiment 1

The nail region detection device according to a first embodiment of the present invention shown in FIG. 1 is composed of a colour camera 61 capable of capturing an image containing a user's hand and a information processing part 70 connected to the colour camera 61 through a cable, etc. The colour camera 61 may be, for instance, a high-speed camera (made by Dragonfly Express, Point Grey). The information processing part 70 only need to have a configuration capable of performing the nail region detection method of the present invention; more specifically, it may be a personal computer or a game machine, provided that it includes a program storage part, in which the program for the nail region detection method of the present invention can be installed, and a configuration for enabling the program to be executed.

The information processing part 70 according to the first embodiment of the present invention has an image data storage part 71, a program storage part 72, a colour specification system conversion plotting part 73, a threshold setting part 74, a second plotting part 75, a long axis detection part 76, a repeat control part 77, a nail determination part 78, a data synthetic part 79, shape determination part 80, and an approximate silhouette shape estimation part 91. The image data storage part 71 and the program storage part 72 may be integrated together into one storage part. Other configurations may be set up as a functional part together by making a storage part and an arithmetic device, for instance RAM, execute the program.

The image data storage part 71 stores the data items on an image containing the user's hand captured by the colour camera 61. The program storage part 72 stores the post-installation program for the nail region detection method of the present invention but it may stores the pre-installation program. Moreover, the pre-installation program may be stored in any of detachable and portable storage media, such as a memory card and disk-shaped memories including CD-R.

Figure 2:
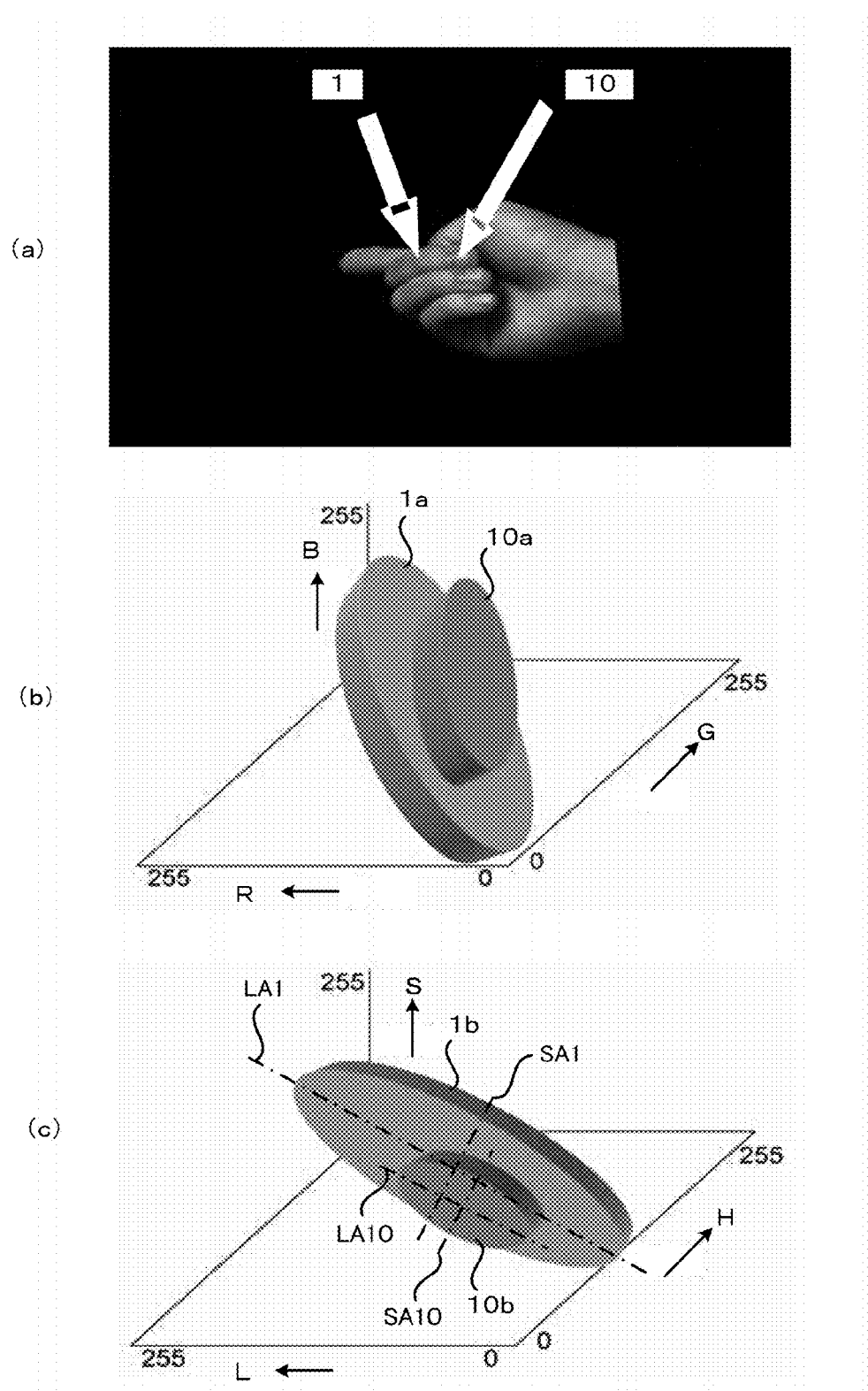
FIG. 2 is a view showing a variation in a data region when the data items on a hand image have been converted from a RGB colour specification system to a HLS colour specification system, according to the first embodiment.

The colour specification system conversion plotting part 73 converts the data items on the captured image from the RGB colour specification system used by the colour camera to the HLS colour specification system, and then plots the converted data items in the three-dimensional colour spatial first graph. The three-dimensional colour space on the RGB colour specification system is made of an R axis for red, a G axis for green, and a B axis for blue and the data items of the captured image of an original hand are plotted at the predetermined positions in the RGB colour specification system. For instance, when a nail 10 is positioned at the tip of a skin region 1 of the middle finger as shown in FIG. 2 (*a*), a skin region 1*a*, which is constructed by the distributed plotting data items of the RGB image data items as shown in FIG. 1*b*, is positioned in the direction obliquely upward relative to a RG plane; in other words, the skin region 1*a* is positioned at a skewed position in the RGB space. A nail region 10*a*, which is constructed similarly by the distributed plotting date items overlap the skin region 1 and is also positioned at a skewed position in the RGB space.

Moreover, the nail region 10*a* and the skin region 1*a* are disk-shaped like an ellipse (flattened circle) as shown in FIG. 2 (*b*); in short, it has a familiar shape, for instance, an elliptic hamburger steak, elliptic deep-flied patty of fish paste, Goheimochi, etc. To create an interface between the nail region 10*a* and the skin region 1*a*, a plane rising obliquely upward from the RG plane must be created in terms of the positional relationship between the nail region 10*a* and the skin region 1*a*, which makes it difficult to create the interface.

On the other hand, the data items on the captured image as shown in FIG. 2 (*b*) are seen as shown in FIG. 2 (*c*) after being converted to the HLS colour specification system and plotted in the three-dimensional colour spatial first graph in the HLS coordinate system. The skin region 1*b* is perpendicular to an H axis and parallel to an L axis, and the nail region 10*b*, which overlaps the skin region 1*b*, is also perpendicular to the H axis and parallel to the L axis. Accordingly, to create an interface between the nail region 10*b* and the skin region 1*b*, it is only needed to draw a plane parallel to an HS plane, which makes it easier to create the interface. Furthermore, the nail region 10*b* and the skin region 1*b* are disk-shaped like flattened ellipses as with those shown in FIG. 2 (*b*). Since the skin region 1*b* is disk-shaped like an ellipse, a long axis LA1 and a short axis SA1 can be set, and similarly, since the nail region 10*b* is disk-shaped like an ellipse, a long axis LA10 and a short axis SA10 can be set.

Figure 3:
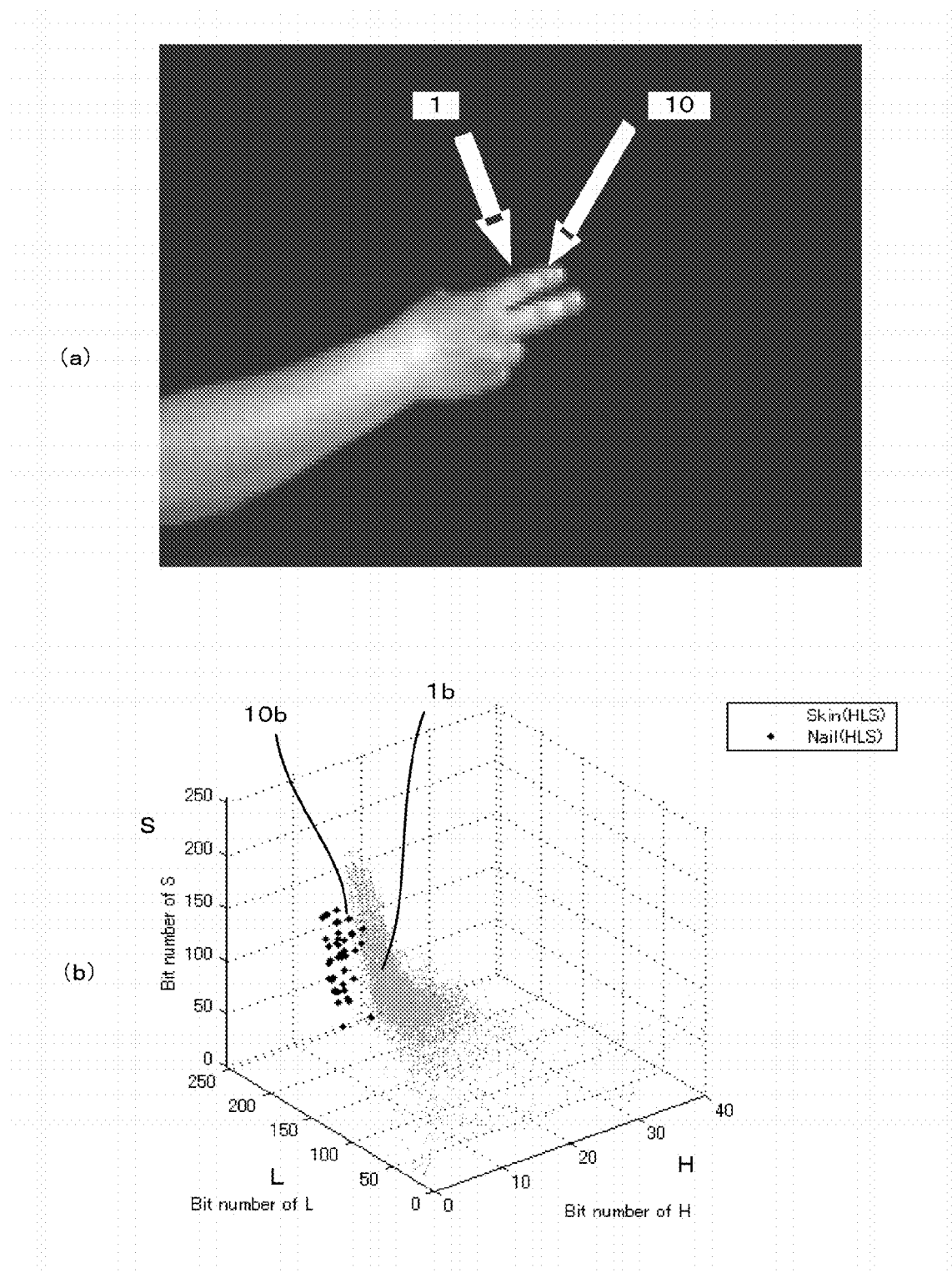
FIG. 3 is a view showing the data items on the image converted to the HLS colour specification system, according to a first example of the first embodiment.

FIG. 3 (*a*) illustrate the first example, according to which the data items on the image in the RGB colour specification system, in which only two fingers, the index and middle fingers, are stuck out and other fingers are flexed, and the nails 10 are positioned at the tips of the skin regions 1 of the index and middle finger, captured from the side of the back of the hand by a colour camera. In contrast, FIG. 3 (*b*) is a view showing the data items on the image shown in FIG. 3 (*a*), which have been converted to the HLS colour specification system and plotted in the color space in the HLS coordinate system.

In FIG. 3 (b), the region, which is rendered as a grey cluster formed from a number of dense small dots in the colour space in the HLS coordinate system, is the nail region 10b, and the region, which is rendered as a coarse cluster formed from a relatively less number of large dots, is the nail region 10b. In FIG. 3 (b), the skin region 1b is roughly contained within the range of the predetermined region in the vicinity of the LS plane positioned at one predetermined value along the H axis. Moreover, in FIG. 3 (b), the nail region 10b is also roughly contained within the range of the predetermined region in the vicinity of the LS plane positioned at the other predetermined value (less than the predetermined value for the skin region 1b) along the H axis. Thus, it is obvious that even though the skin region 1b and the nail region 10b are shaped differently from an ellipse, they can be roughly split at the interface parallel to the HS plane in FIG. 3 (b), as seen in FIG. 2 (c).

In order to approximate the skin region 1b and the nail region 10b, both of which are shaped differently from an ellipse shown in FIG. 2 (c), to the disk shape like an ellipse finally, for instance, expansion operation is performed on the plotting data items until the region corresponding to each of the plot data items overlaps fully the region corresponding to each of the nearby plotting data items, and then degeneration operation is repeated on the large region formed by the overlapping region corresponding to each of the plotting data items to reduce the amount of rough parts around the outer edge of the each region, so as to reshape into a smooth approximate arc. In this way, the long axis LA1 and the short axis SA1 can be set in the skin region 1b, and the long axis LA10 and the short axis SA10 can be set in the nail region 10b.

Figure 4:
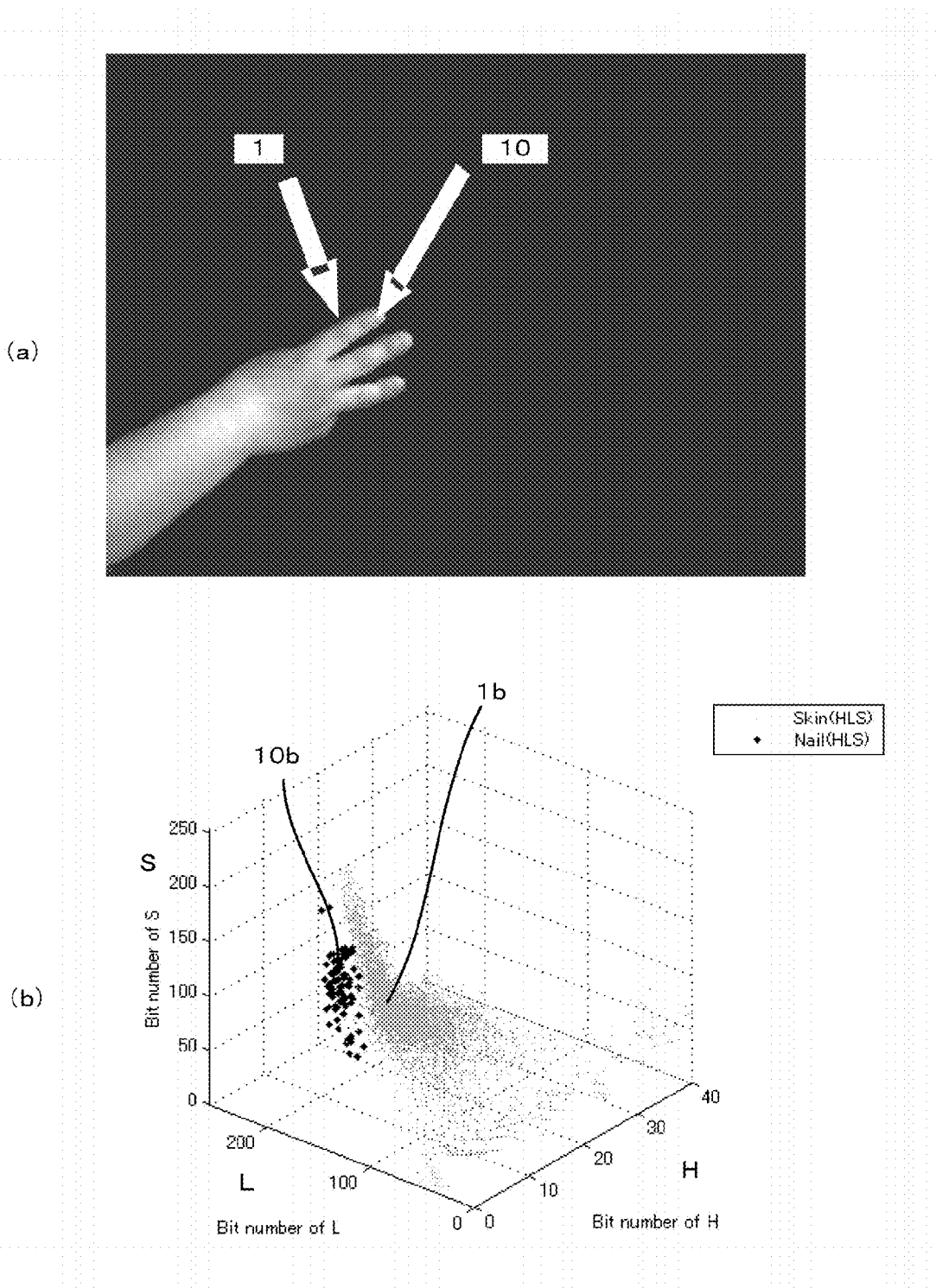
FIG. 4 is a view showing the data items on the image converted to the HLS colour specification system, according to a second example of the first embodiment.

FIG. 4 (a) illustrate the second example, according to which the data items on the image in the RGB colour specification system, in which only three fingers, the index, middle, and third fingers, are stuck out and other two fingers are flexed, and the nails 10 are positioned at the tips of the skin regions 1 of the index, middle, and third fingers, captured from the side of the back of the hand by a colour camera. In contrast, FIG. 4 (b) is a view showing the data items of the image shown in FIG. 4 (a), which have been converted to the HLS colour specification system and plotted in the color space in the HLS coordinate system.

As seen in FIG. 3(b), it is obvious from FIG. 4 (b) that the skin region 1b and the nail region 10b, both of which are plotted in the colour space in the HLS coordinate system, are shown, and each of both regions is roughly contained within the range of the predetermined region in the vicinity of the LS plane at the predetermined value along the H axis; accordingly, even though these regions are differently shaped, they can be split roughly at the interface parallel to the HS plane. Moreover, as seen in FIG. 3 (b), each of the skin region 1b and the nail region 10b can be disk-shaped to an approximate ellipse finally by repeating expansion and degeneration operations on the plotting items in the plotting regions. Thus, the long axis LA1 and the short axis SA1 can be set in the skin region 1b, and the long axis LA10 and the short axis SA10 can be in the nail region 10b.

Figure 5:
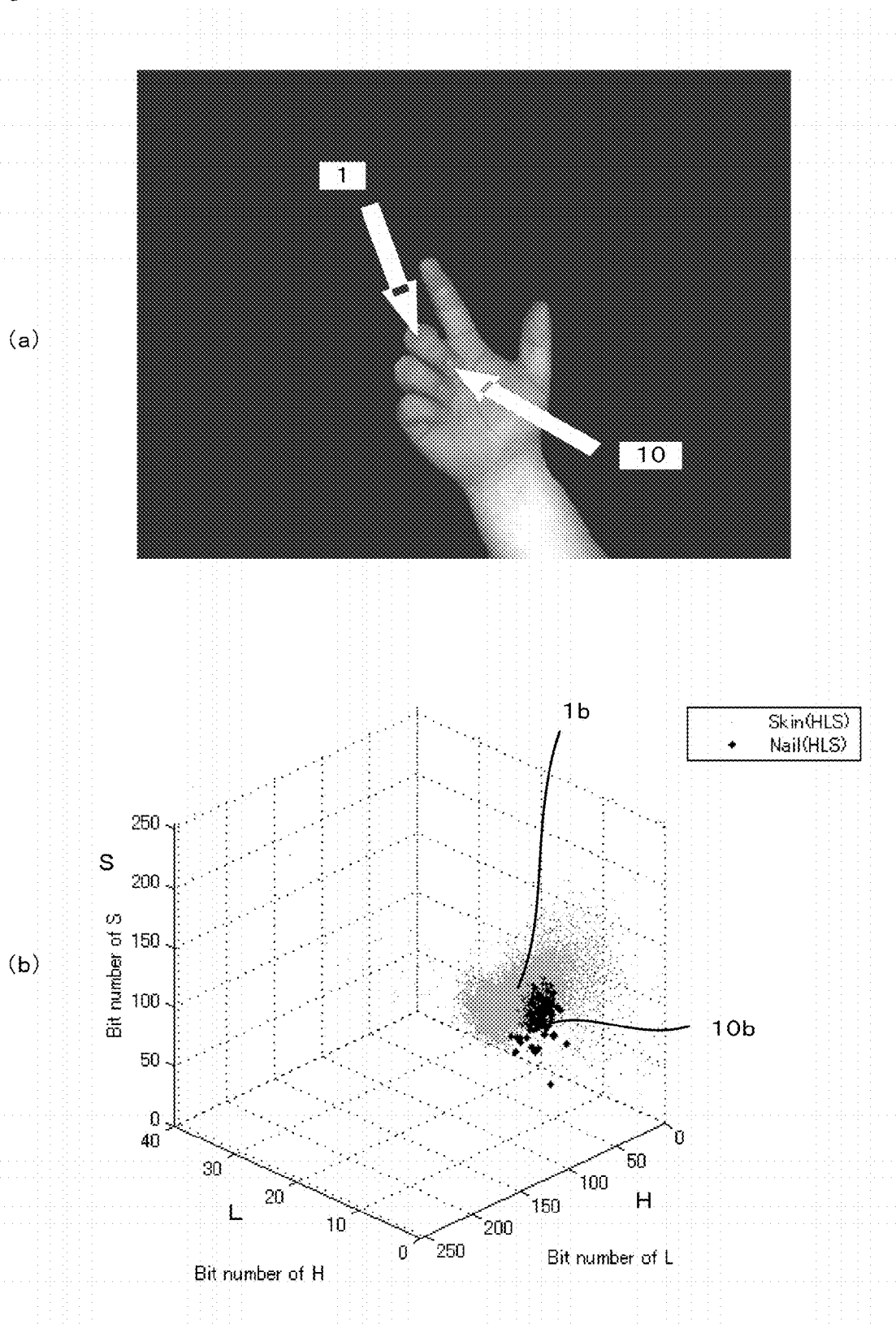
FIG. 5 is a view showing the data items on the image converted to the HLS colour specification system, according to a third example of the first embodiment.

FIG. 5 (a) illustrates the third example, according to which the data items on the image in the RGB colour specification system, in which only three fingers, the index, middle, and third fingers, are stuck out and other two fingers are flexed, and the nails 10 are positioned at the tips of the skin regions 1 of the index, middle, and third fingers, captured from the side of the back of the hand by a colour camera. In contrast, FIG. 5 (b) is a view showing the data items on the image shown in FIG. 5 (a), which have been converted to the HLS colour specification system and plotted in the color space in the HLS coordinate system.

As seen in FIG. 3 (b) or FIG. 4 (b), it is obvious from FIG. 5 (b) that the skin region 1b and the nail region 10b plotted in the colour space in the HLS coordinate system are shown and each of these regions is roughly contained within the range of the predetermined region in the vicinity of the LS plane positioned at the predetermined value along the H axis; accordingly, these regions can be roughly split at the interface parallel to the LS plane positioned, each of these regions can be disk-shaped like an approximate ellipse finally, and the long axis LA1 and the short axis SA1 can be set in the skin region 1b, and the long axis LA10 and the short axis SA10 can be in the nail region 10b.

Figure 6:
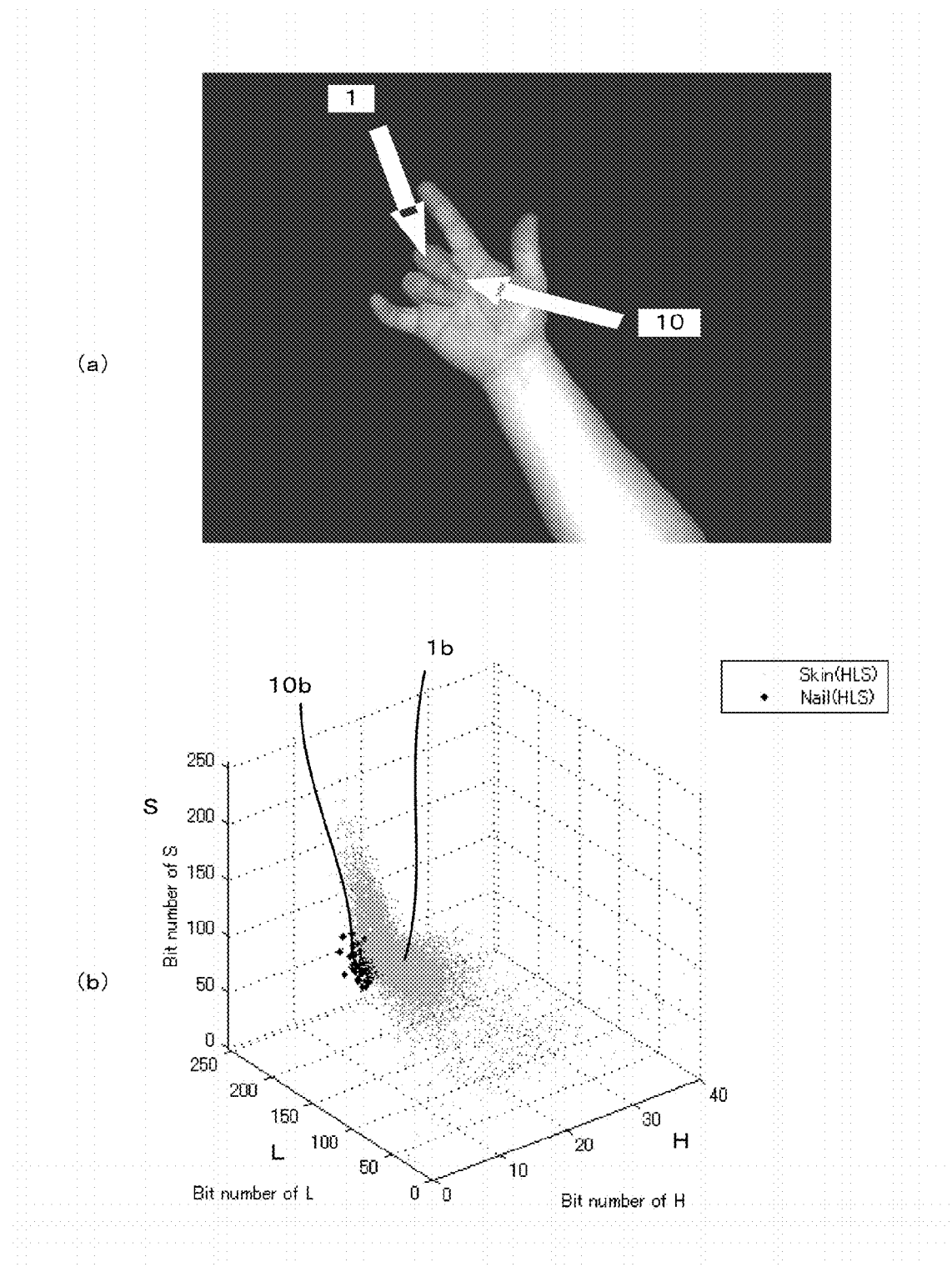
FIG. 6 is a view showing the data items of the image converted to the HLS colour specification system, according to a fourth example of the first embodiment.

FIG. 6 (a) illustrates the fourth example, according to which the data items on the image in the RGB colour specification system, in which only three fingers, the index, middle, and little fingers, are stuck out and other two fingers are flexed, and the nails 10 are positioned at the tips of the skin regions 1 of the middle and third fingers, captured from the side of the palm of the hand by a colour camera. In contrast, FIG. 6 (b) is a view showing the data items of the image shown in FIG. 6 (a), which have been converted to the HLS colour specification system and plotted in the color space in the HLS coordinate system.

As seen in FIG. 3 (b) or FIG. 4 (b), or FIG. 5 (b), it is obvious from the FIG. 6 (b) that the skin region 1b and the nail region 10b plotted in the colour space in the HLS coordinate system are shown and each of these regions is roughly contained within the range of the predetermined region in the vicinity of the LS plane positioned at the predetermined value along the H axis; accordingly, these regions can be roughly split at the interface parallel to the LS plane positioned, each of these regions can be disk-shaped like an approximate ellipse finally, and the long axis LA1 and the short axis SA1 can be set in the skin region 1b, and the long axis LA10 and the short axis SA10 can be in the nail region 10b.

Figure 7:
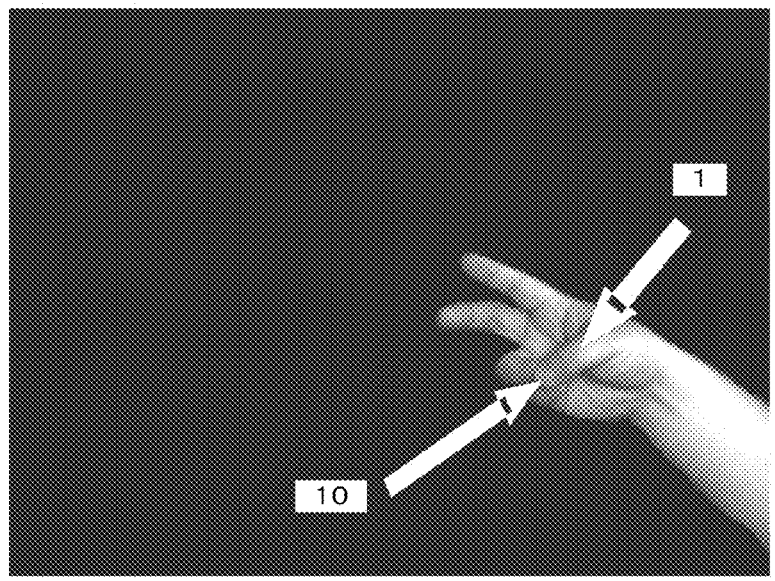
FIG. 7 is a view showing the data items of the image converted to the HLS colour specification system, according to a fifth example of the first embodiment.
Figure 7:
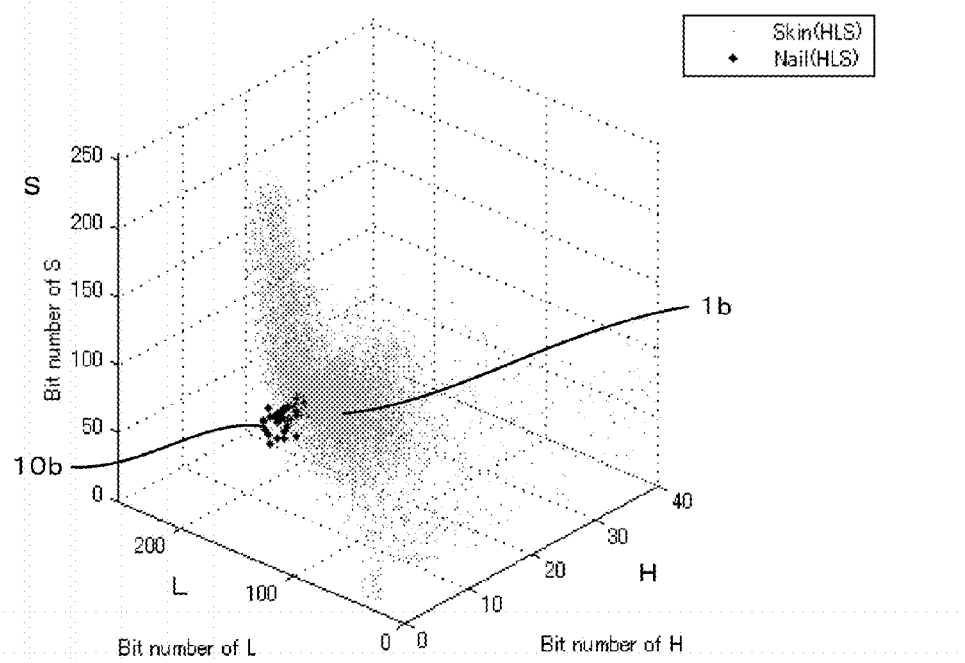

FIG. 7 (a) illustrates the fifth example, according to which the data items on the image in the RGB colour specification system, in which only two fingers, the index and middle fingers, are stuck out and other three fingers are flexed, and the nails 10 are positioned at the tips of the skin regions 1 of the thumb and the little finger, and the nail 10 positioned at the tip of the hand image (skin) 1 of the third finger is masked by the thumb, captured from the side of the palm of the hand by a colour camera. In contrast, FIG. 7 (b) is a view showing the data items on the image shown in FIG. 7 (a), which have been converted to the HLS colour specification system and plotted in the color space in the HLS coordinate system.

As seen in FIGS. 3 (b) to 6 (b), it is obvious from FIG. 7 (b) that the skin region 1b and the nail region 10b plotted in the colour space in the HLS coordinate system are shown and each of these regions is roughly contained within the range of the predetermined region in the vicinity of the LS plane positioned at the predetermined value along the H axis; accordingly, these regions can be roughly split at the interface parallel to the LS plane positioned, each of these regions can be disk-shaped like an approximate ellipse finally, and the long axis LA1 and the short axis SA1 can be set in the skin region 1b, and the long axis LA10 and the short axis SA10 can be in the nail region 10b.

Figure 8:
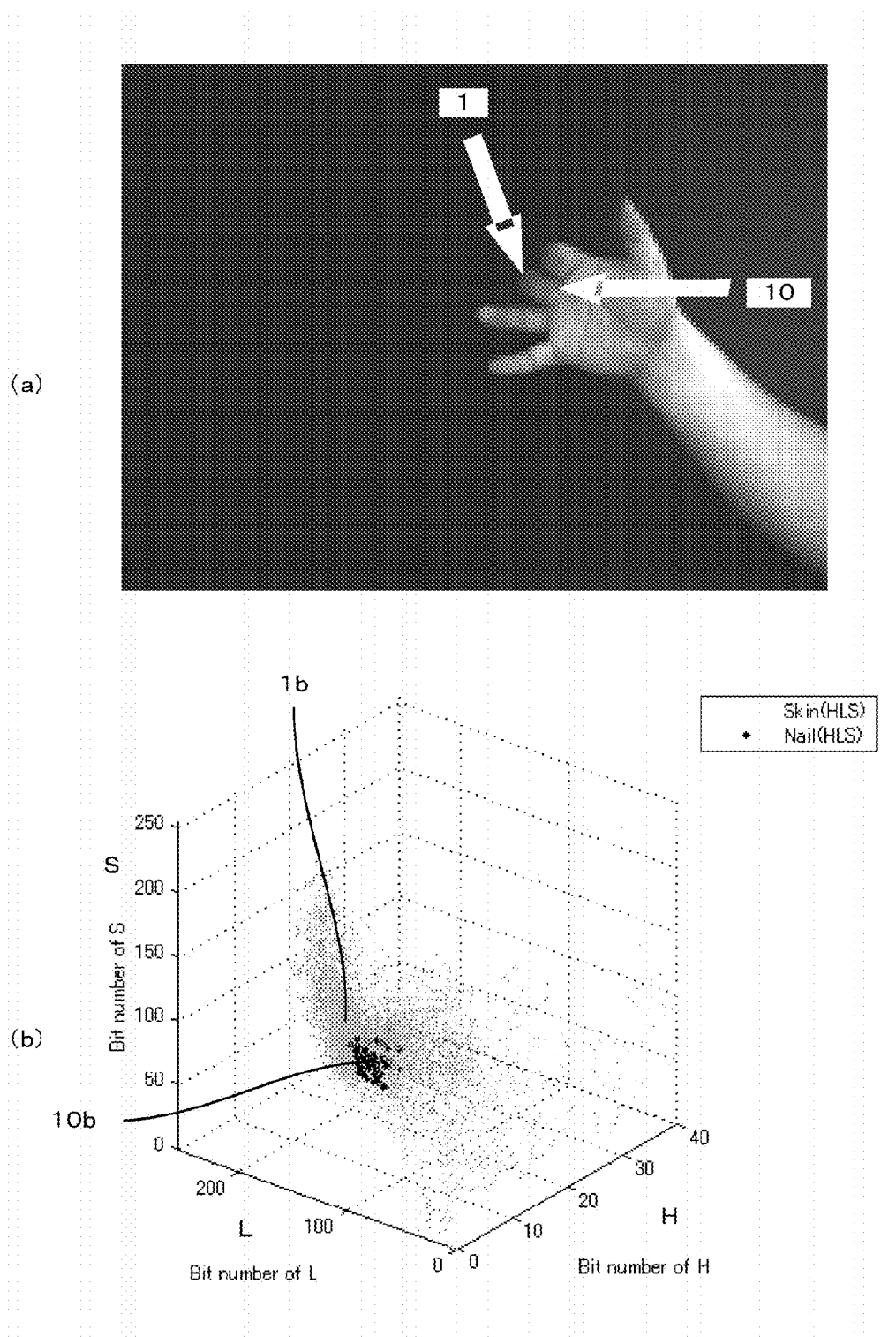
FIG. 8 is a view showing the data items of the image converted to the HLS colour specification system, according to a sixth example of the first embodiment.

FIG. 8 (a) illustrates the sixth example, accordingly to which the data items on the image in the RGB colour specification system, in which only three fingers, the thumb and the third and little fingers, are stuck out and other two fingers, the index and middle fingers, are flexed, and the nails 10 are positioned at the tips of the skin regions 1 of the index and middle fingers, captured from the side of the palm of the hand by a colour camera. In contrast, FIG. 8 (*b*) is a view showing the data items on the image shown in FIG. 8 (*a*), which have been converted to the HLS colour specification system and plotted in the color space in the HLS coordinate system.

As seen in FIG. 3 (*b*) to FIG. 7 (*b*), it is obvious from FIG. 8 (*b*) that the skin region 1*b* and the nail region 10*b* plotted in the colour space in the HLS coordinate system are shown and each of these regions is roughly contained within the range of the predetermined region in the vicinity of the LS plane positioned at the predetermined value along the H axis; accordingly, these regions can be roughly split at the interface parallel to the LS plane positioned, each of these regions can be disk-shaped like an approximate ellipse finally, and the long axis LA1 and the short axis SA1 can be set in the skin region 1*b*, and the long axis LA10 and the short axis SA10 can be in the nail region 10*b*.

Figure 9:
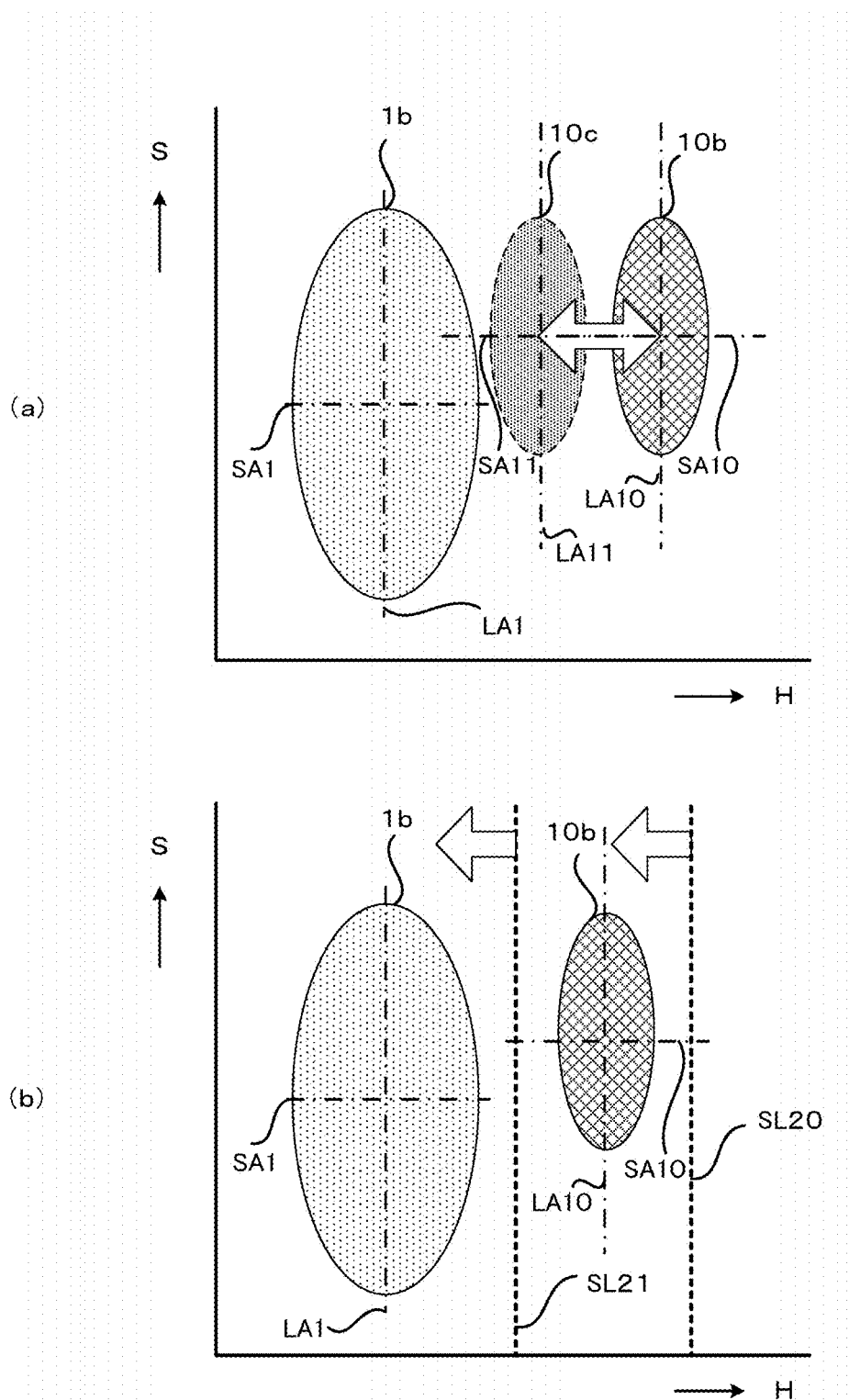
FIG. 9 is a view illustrating a process of plotting the data items of the image converted to the HLS colour specification system in a HS coordinate system for region setting, according to the first embodiment.

In FIGS. 9 (*a*) and 9 (*b*), the data items of the image distributed in the skin region 1*b* and the nail region 10*b* (10*c*), both of which are plotted in the colour space in the three-dimensional HLS coordinate system, are replotted (mapped) so as to be distributed in a plane in the two-dimensional HS coordinate system, and the region, in which each of data items is distributed, is disk-shaped approximately like an ellipse by repeating the expansion and degeneration operations to set the long axis LA10 and the short axis SA10 in the nail region 10 B (c).

FIG. 9(*a*) shows two nail regions, 10*b* and 10*c*. As known from FIG. 3 (*b*) to FIG. 7 (*b*), since the distance between the skin region 1*b* and the nail region 10*b* may be varied depending on the hand pose and hand tracking, etc., the nail region 10*b* is far from the skin region 1*b*, whereas the nail region 10*c* is close to the skin region 1*b*.

As known from FIG. 9 (*b*), the thresholds SL21 and SL 20 can be set in the nail region 1*b* and the nail region 10*b*, in line with the values along the hue (H) axis and parallel to other axes. These threshold values allow the data items equal to or greater than them to be extracted from the data items of the image in the skin region 1*b* and the nail region 10*b*. It should be noted that as shown in FIG. 9(*a*), since the distance between the skin region 1*b* and the nail region 10*b* is varied, it is possible that the nail region 10*b* approaches or overlaps the skin region 1*b*; however, the data items equal to or greater than the threshold values can be extracted from the data items of the image in each of regions unless the nail region 10*b* overlaps fully the skin region 1*b*.

In FIG. 9 (*b*), the thresholds SL21 and SL20 are set along the hue (HUE) axis out of two axes in the HS coordinate system (HS space), and the maximum or minimum values for the skin region 1*b* and the nail region 10*b*, both of which are the first plotting regions, are arithmetically obtained, the initial values for the thresholds are set to hue values on the outside of one of the maximum and minimum values, and then the values are varied in the direction traversing the skin region 1*b* and the nail region 10*b*.

In this case, it is impossible that the nail region 10*b* is smaller in size width of the S axis than the skin region around thereof and on the contrary, the skin region 1*b* is smaller in size width of the S axis than the nail region 10*b*. Accordingly, the maximum size for the S axis value is obtained in the region, where a plurality of plotting data items, for which no corresponding hand parts are known, are distributed, and if the maximum size for the S axis value is equal to or less than the predetermined value (namely, the nail region 10*b*), it is likely to be the nail region 10*b* and when the maximum sizes for the S axis value in the two regions are compared, the smaller value is likely to be the nail region 10*b*. However, the maximum size for the S axis value is not always obtained only when the long axes LA10 and the LA1 of elliptic disk-shapes in the nail region 10*b* and the skin region 1*b* are conveniently parallel to the S axis; hence, for instance, if the data distribution is inclined from the S axis and the long axis is also inclined, no difference exist between the long axis LA10 and the LA1 in some cases.

More specifically, for instance, the initial value for the threshold value SL20 is set to the value on the outside (on the side of greater value than) of the maximum value along the HUE axis in the nail region 10*b* to vary the nail region 10*b* in the direction traversing the nail region 10*b*. On the contrary, in this case, the initial value for the threshold value SL20 may be set to the value on the outside (on the side of less value than) of the minimum value to vary in the direction traversing the nail region 10*b*. In addition, with the threshold value SL20 varied, only the plotting data items, for which the HUE axis values are greater than the threshold value SL20 (less than the threshold value SL20, when the initial value is the minimum value), are replotted in the second graph. The long axes in a plurality of second plotting regions in the second graph are detected to measure the maximum length size along the long axis.

Similarly, the initial value for the threshold value SL21 is set to the value on the outside (on the side of greater value than) of the maximum value along the HUE axis in the skin region 1*b* to vary the skin region 1*b* in the direction traversing the skin region 1*b*. On the contrary, in this case, the initial value for the threshold value SL21 may be set to the value on the outside (on the side of less value than) of the minimum value to vary in the direction traversing the skin region 1*b*. In addition, with the threshold value SL21 varied, only the plotting data items, for which the HUE axis value are greater than the threshold value SL20 (less than the threshold value SL21, when the initial value is the minimum value), are replotted in the second graph. The long axes in a plurality of second plotting regions in the second graph are detected to measure the maximum length size along the long axis.

In above explanations, the nail region 10*b* and the skin region 1*b* are simply referred to as the nail region and skin region, respectively in each of the regions for explanatory convenience; however, assuming that the data distribution region corresponding to the nail region is unknown among a plurality of plotting data distribution regions, only by comparing between the sizes along the long axes in both the regions, the nail region may not be determined in some cases. More specifically, for instance, if the long axis is not parallel to the S axis and the data distribution is inclined from the S axis, no difference in size may exist between both the regions or they may be reversed in some cases.

Figure 10:
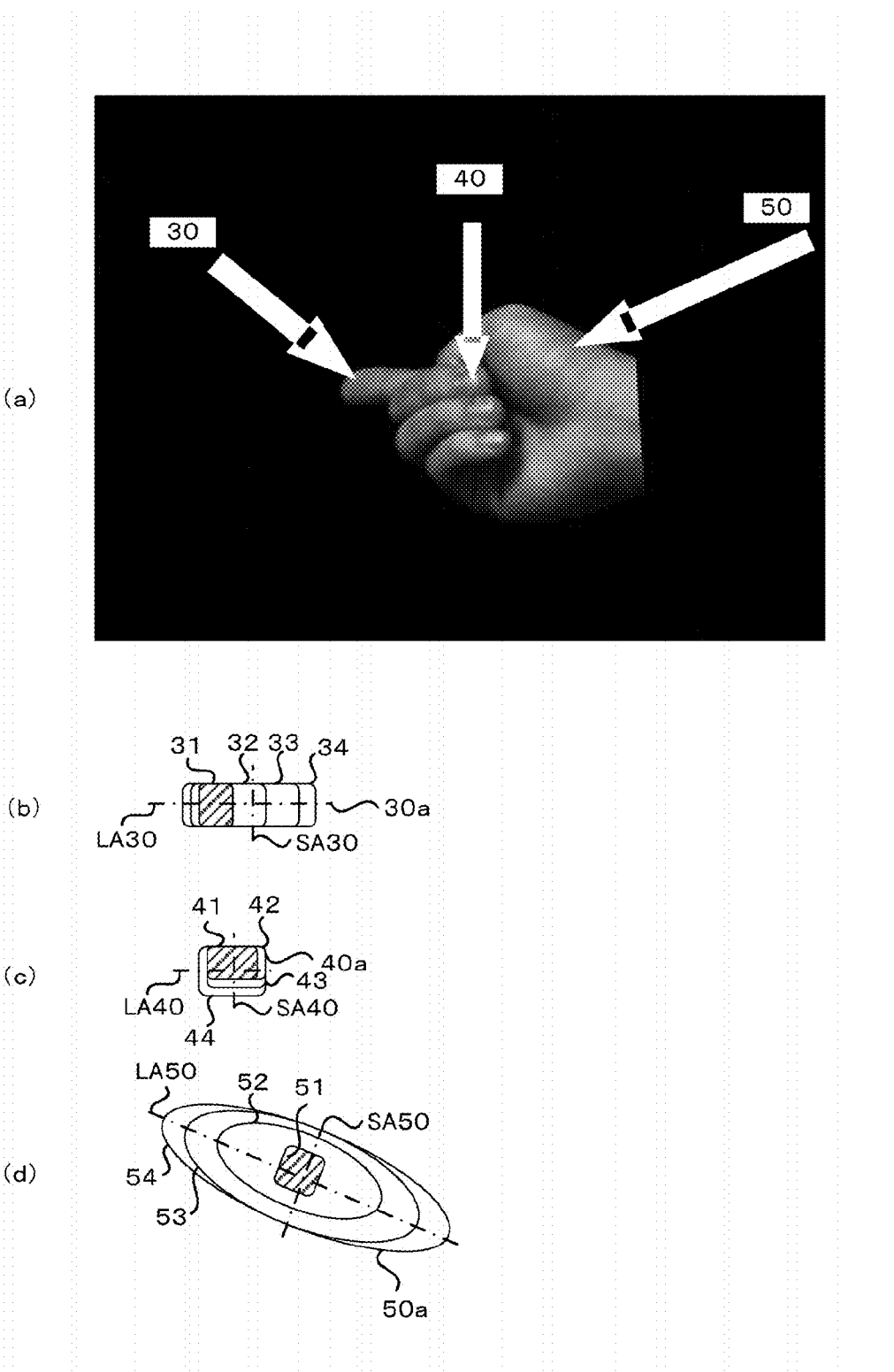
FIG. 10 is a view illustrating a process of increasing or decreasing the data plotting region, in which data items equal to or greater than the variable threshold value in the HS coordinate system, according to the first embodiment, are plotted.

The data items of the hand shown in FIG. 10 (*a*) are the same as those of the hand shown in FIG. 2 (*a*) and similar to those of the hand shown in FIG. 5 (*a*). FIG. 10 (*a*) shows a process that with respect to the nail 40, the finger pulp 30, which is similar in hue to the nail 40, and a thenar 50 on the base of the thumb, which is also similar in hue to the nail 40, the plotting data regions, in which the data items of the image equal to or greater than the variable threshold value in the HS coordinate system are plotted, increase when the threshold is varied in the direction traversing the region from the outside of the maximum value for the HUE axis value. The results of this process are shown in FIGS. 10(*b*) to 10(*d*).

FIG. 10 (*b*) shows a process that with respect to the plotting data region for the finger pulp 30, the second plotting region 30*a* is obtained by replotting only the plotting data items, for which HUE axis values are equal to or greater than the threshold value SL21, among plotting data items when the threshold value is varied in the direction traversing the region from the outside of the maximum value for the HUE axis value. The second plotting region 30a is a small region obtained when the threshold is approximate to the initial value. In this case, the long axis is longitudinally shown in the paper space of FIG. 10 and becomes the axis parallel to the final short axis SA 30. However, as the threshold value is varied, the second plotting region 31 enlarges laterally as shown in the paper space of FIG. 10 and is reshaped into a horizontally-long shape when extending into the second plotting regions 32, 33, and 34 sequentially. In the final second plotting region 34, the long axis LA30 is laterally shown and the short axis SA30 is longitudinally shown in the paper space of FIG. 10. Thus, for the finger pulp 30, the length size of the second plotting region 30a along the long axis may change from the longitudinal direction to lateral direction depending on the threshold, and the amount of variation in the first long axis (final short axis SA30) is less but the amount of variation in the first short axis (final long axis LA30) is great; hence, the long axis might be misinterpreted if it would be interpreted based only on the length size along the long axis.

FIG. 10 (c) shows a process that with respect to the plotting data region for the nail 40, the second plotting region 40a is obtained by replotting only the plotting data items, for which HUE axis values are equal to or greater than the threshold SL20, among plotting data items when the threshold value is varied in the direction traversing the region from the outside of the maximum value for the HUE axis value. The second plotting region 41 is a small region obtained when the threshold is approximate to the initial value. In this case, the long axis is laterally shown in the paper space of FIG. 10 and becomes the axis parallel to the final long axis LA 40. In this case, as the threshold is varied, the second plotting region 41 enlarges slightly both longitudinally and laterally as seen in the paper space of FIG. 10 but remains almost the same shape with the slightly smaller size when extending into the second plotting regions 42, 43, and 44 sequentially. In the final second plotting region 44, the long axis LA40 is laterally shown and the short axis SA40 is longitudinally shown in the paper space of FIG. 10. Thus, for the nail 40, the amount of variation in the size of the second plotting region 40a depending on the threshold value is negligibly small and the amounts of variation in the length sizes along both the long axis and short axis are also small.

FIG. 10 (d) shows a process that with respect to the plotting data region for the thenar 50, the second plotting region 50a is obtained by replotting only the plotting data items, for which HUE axis values are equal to or greater than the threshold value SL21, among plotting data items when the threshold value is varied in the direction traversing the region from the outside of the maximum value for the HUE axis value. The second plotting region 51 is a small region obtained when the threshold is approximate to the initial value. In this case, the long axis is shown in the direction 20 degree-inclined clockwise from the longitudinal direction in the paper space of FIG. 10 and becomes the axis parallel to the final short axis SA 50. However, as the threshold is varied, the second plotting region 51 enlarges along the long axis LA50 as shown in the paper space of FIG. 10 and is reshaped into a horizontally-long shape when extending into the second plotting regions 52, 53, and 54 sequentially. In the final second plotting region 54, the long axis LA50 is shown in the direction 20-degree-inclined clockwise from the lateral direction and the short axis SA50 is shown in direction the 20-degree-inclined clockwise from the longitudinal direction in the paper space of FIG. 10. Thus, for the thenar 50, the direction of the second plotting region 50a may change from the short axis SA50 in the approximately longitudinal direction to the long axis LA50 in the approximately lateral direction depending on the threshold, and the amount of variation in the first long axis (final short axis SA50) is small but the amount of variation in the first short axis (final long axis LA50) is large; hence, the long axis might be misinterpreted if it would be interpreted based only on the length size along the long axis.

Figure 11:
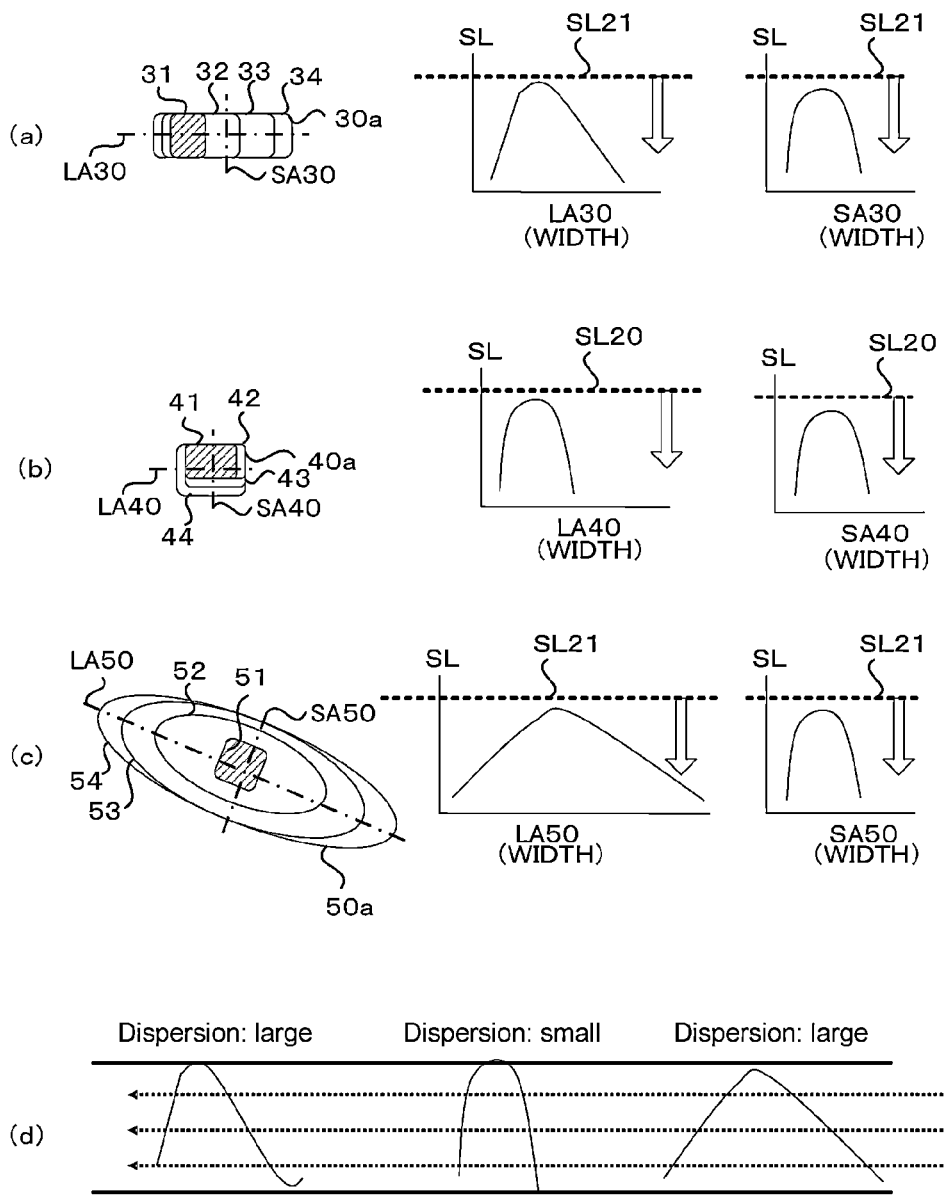
FIG. 11 is a view illustrating a process that the gradient of the amount of variation in length size along a long axis is varied in line with the variable threshold value in the HS coordinate system with respect to the nail region and the other skin region, according to the first embodiment.

The left figure of FIG. 11 (a) shows the second plotting regions 31, 32, 33, and 34 for the plotting data items equal to or greater than the HUE axis threshold value SL 21, among the plotting data items, with respect to the second plotting region 30a (plotting data region) of the finger pulp 30 shown in FIG. 10 (b), when the threshold SL21 is varied in the direction traversing the region from the outside of the maximum value for the HUE axis value.

The middle figure shows the variation in width of the long axis LA30 when the threshold values 21 is varied in the direction traversing the plotting data region assuming that the directions of the long axis LA 30 and the threshold value SL21 are almost the same in the second plotting region 30a of the finger pulp 30.

The right figure shows the variation in width of the short axis SA30 when the threshold values 21 is varied in the direction traversing the plotting data region assuming that the directions of the short axis SA 30 and the threshold value SL21 are almost the same in the second plotting region 30a of the finger pulp 30.

As known from the comparison between the middle and right figures, the variation in width of the long axis LA30 is large but the variation in width of the short axis SA30 is small.

The left figure of FIG. 11 (b) shows the second plotting regions 41, 42, 43, and 44 for the plotting data items equal to or greater than the HUE axis threshold SL 20, among the plotting data items, with respect to the second plotting region 40a (plotting data region) of the nail 40 shown in FIG. 10 (c), when the threshold SL20 is varied in the direction traversing the region from the outside of the maximum value for the HUE axis value.

The middle figure shows the variation in width of the long axis LA40 when the threshold values SL 20 is varied in the direction traversing the plotting data region assuming that the directions of the long axis LA 40 and the threshold value SL20 are almost the same in the second plotting region 40a of the nail 40. The right figure shows the variation in width of the short axis SA40 when the threshold values SL20 is varied in the direction traversing the plotting data region assuming that the directions of the short axis SA 40 and the threshold value SL20 are almost the same in the second plotting region 40a of the nail 40.

As known from the comparison between the middle and right figures, the variation in width of both the long axis LA40 and the short axis SA40 is small.

The left figure of FIG. 11 (c) shows the second plotting regions 51, 52, 53, and 54 for the plotting data items equal to or greater than the HUE axis threshold SL 21, among the plotting data items, with respect to the second plotting region 50a (plotting data region) of the thenar 50 shown in FIG. 10(d), when the threshold SL21 is varied in the direction traversing the region from the outside of the maximum value for the HUE axis value.

The middle figure shows the variation in width of the long axis LA40 when the threshold values SL 21 is varied in the direction traversing the plotting data region assuming that the directions of the long axis LA 50 and the threshold value SL21 are almost the same in the second plotting region 50a of the thenar 50.

The right figure shows the variation in width of the short axis SA50 when the threshold values SL21 is varied in the direction traversing the plotting data region assuming that the directions of the short axis SA 50 and the threshold value SL21 are almost the same in the second plotting region 50a of the thenar 50.

As known from the comparison between the middle and right figures, the variation in width of the long axis LA50 is large and the variation in width of the short axis SA50 is small.

As known FIGS. 11 (a), 11(b), and 11 (c), compared with the second plotting region 30a of the finger pulp 30 and the second plotting region 50a of the thenar 50, the second plotting region 40a of the nail 40 is small in ratio of variation (variation gradient) along the long axis LA 40 than those along other long axes, LA 30 (finger pulp 30) and LA 50 (thenar 50). Thus, it is obvious that the nail region can be determined based on the ratio of variation (variation gradient) in length size along the long axis in each plotting data distribution region, even though the corresponding nail region cannot be known among a plurality of plotting data distribution regions.

In FIG. 11 (d), the middle figures in FIGS. 11 (a), 11 (b), and 11(c) are laterally arranged with the threshold value varied. According to this embodiment, with the threshold decreased, the area of each plotting region increases so that its size is enlarged along the long axis and the degree of pixel dispersion is large; whereas, for the nail, the amount of enlargement of its area is relatively small and the degree of pixel dispersion is also relatively small.

Figure 12:
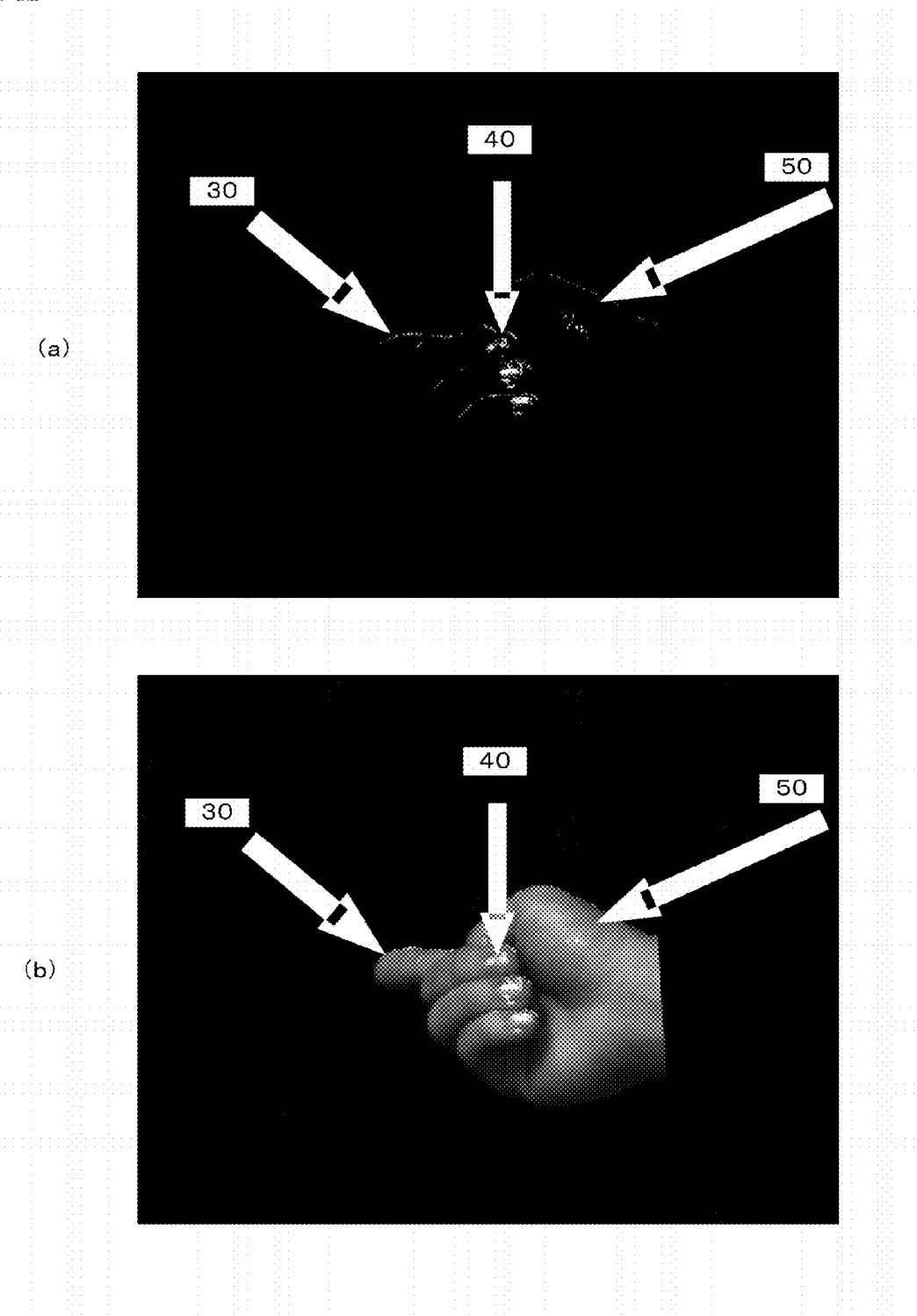
FIG. 12 is a view showing the plotting data region, in which data items equal to or greater than a highest (maximum) threshold value in the HS coordinate system are plotted, according to the first embodiment.

FIG. 12 (a) is a distribution chart illustrating the seventh example, according to which only the plotting data items, for which the hue axis value are equal to or greater than the first threshold value SL20, are replotted in the second graph, among the plotting data items, when with respect to data items of the hand image in FIG. 10 (a), the first the threshold value SL20 is set in the vicinity of the maximum value for the data items of the image along the HUE axis.

FIG. 12 (b) is a view synthesized by overlapping the data items replotted in FIG. 12 (a) with the original data items of the hand image in FIG. 10 (a), because it is difficult to determine which data items of the hand image correspond to which positions in the distribution chart, in which the data items are replotted as shown in FIG. 12 (a).

As known from FIGS. 12 (a) and 12 (b), a relatively large number of data items of the nail 40 are replotted and form the plotting data regions of the size approximate to the actual size, even though the first threshold value SL20 is in the vicinity of the maximum value for the data items of the image along the HUE axis, whereas almost no replotted data items of the finger pulp 30 and the thenar 50 are plotted; hence, it is difficult to form the plotting data regions with the sizes approximate to the actual sizes of the finger pulp 30 and the thenar 50 and the plotting data regions with the sizes smaller than the actual sizes are formed.

Figure 13:
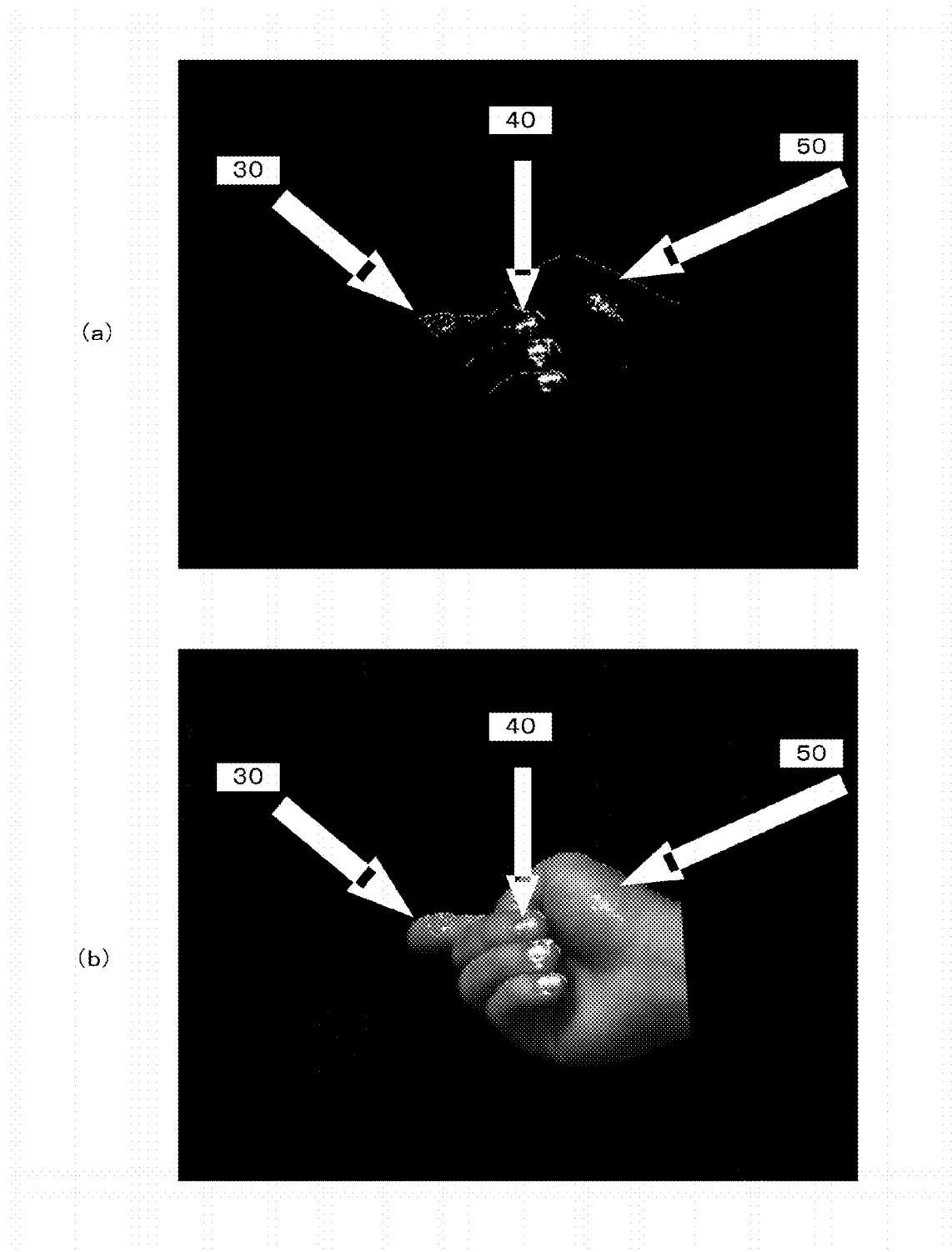
FIG. 13 is a view showing the plotting data region, in which data items equal to or greater than a second highest threshold value in the HS coordinate system are plotted, according to the first embodiment.

FIG. 13 (a) is a distribution chart illustrating the eighth example, according to which only the plotting data items, for which the hue axis values are equal to or greater than the second threshold value SL20, are replotted in the second graph, among the plotting data items, when with respect to data items of the hand image shown in FIG. 10 (a), the second threshold value SL20 is set to the value less than the first threshold value SL20 along the HUE axis shown in FIG. 12 (a).

FIG. 13 (b) is a view synthesized by overlapping the data items replotted in FIG. 13 (a) with the original data items of the hand image in FIG. 10 (a), because it is difficult to determine which data items of the hand image correspond to which positions in the distribution chart, in which the data items are replotted as shown in FIG. 13 (a).

As known from FIGS. 13 (a) and 13 (b), a relatively large number of data items of the nail 40 are replotted and form the plotting data regions of the size approximate to the actual size, when the second threshold value SL20 is less than the first threshold value SL20 in FIG. 12 (a), but the plotting data region with the size approximate to the original size of nail 40 has been formed as shown in FIG. 12 (a); hence, the plotting data region with the size relatively larger than the actual size of the nail 40, is formed. Moreover, plotting of the replotted data of the finger pulp 30 and the thenar 50 starts and the plotting data region larger than that shown in FIG. 12 (a) can be formed. However, it is difficult to plot the plotting data regions with the sizes approximate to the actual sizes of the finger pulp 30 and the thenar 50; hence, the plotting data regions with the sizes considerably smaller than the actual sizes are formed.

Figure 14:
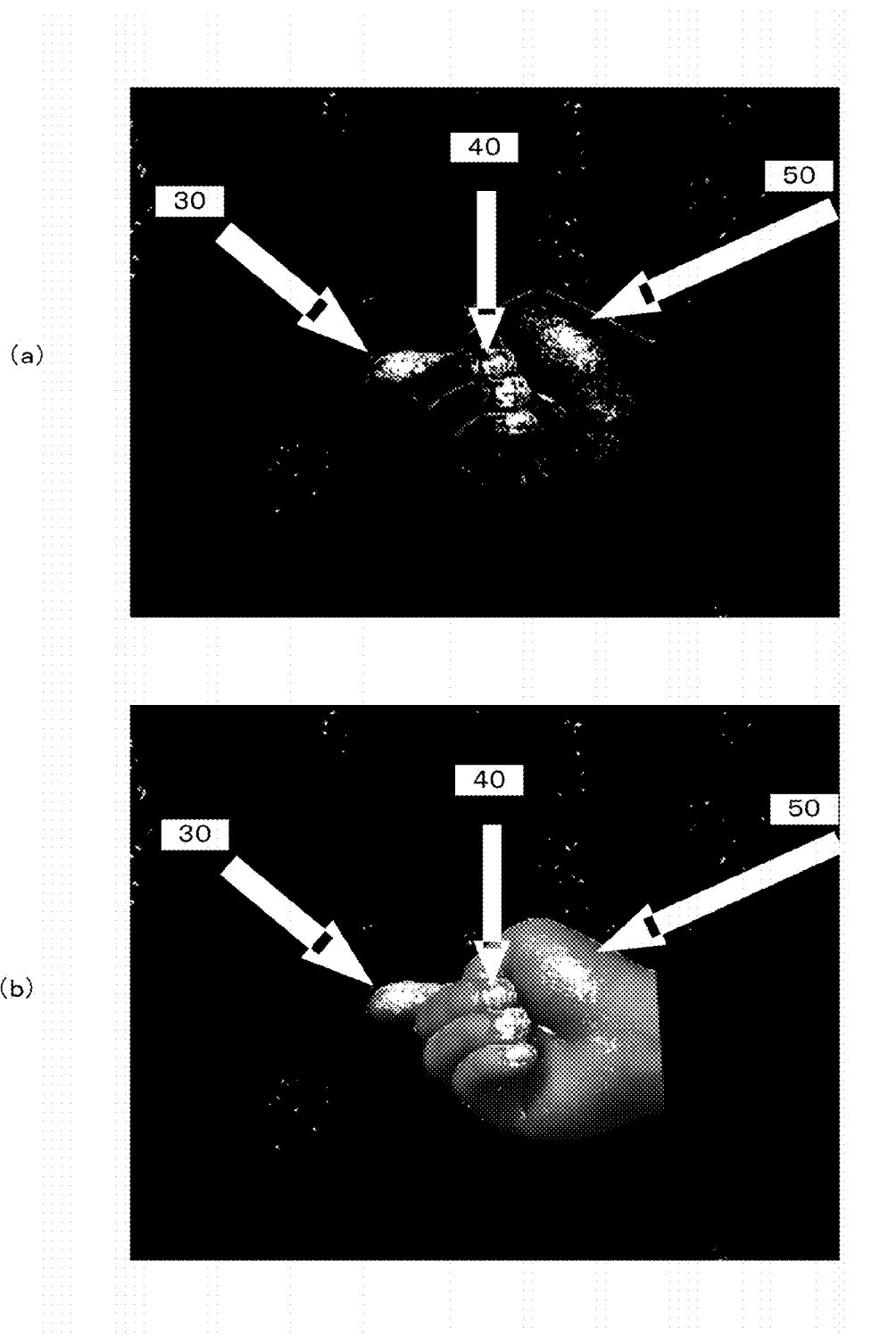
FIG. 14 is a view showing the plotting data region, in which data items equal to or greater than a third highest threshold value in the HS coordinate system are plotted, according to the first embodiment.

FIG. 14 (a) is a distribution chart illustrating the ninth example, according to which only the plotting data items, for which the hue axis values are equal to or greater than the second threshold value SL20, are replotted in the second graph, among the plotting data items, when with respect to data items of the hand image in FIG. 10 (a), the third threshold value SL20 is set to the value further less than the second threshold value SL20 along the HUE axis shown in FIG. 13 (a).

FIG. 14 (b) is a view synthesized by overlapping the data items replotted in FIG. 14 (a) with the original data items of the hand image in its original figure, FIG. 10 (a), because it is difficult to determine which data items of the hand image in its original figure, FIG. 10 (a) correspond to which positions in the distribution chart, in which the data items are replotted as shown in FIG. 14 (a).

As known from FIGS. 14 (a) and 14 (b), a further large number of data items of the nail 40 are replotted, when the third threshold value SL20 is less than the second threshold value SL20 as shown in FIG. 13 (a), but the plotting data region with the size approximate to the original size of nail 40 has been formed as shown in FIG. 13 (a); hence, the plotting data region with the size further larger than the actual size of the nail 40, is formed. Moreover, the amounts of the replotted data items on the finger pulp 30 and the thenar 50 increase and the plotting data regions with the sizes further larger than those shown in FIG. 13 (a) can be formed. However, it is still difficult to plot the plotting data regions with the sizes approximate to the actual sizes of the finger pulp 30 and the thenar 50; hence, the plotting data regions with the sizes relatively smaller than the actual sizes are formed.

Figure 15:
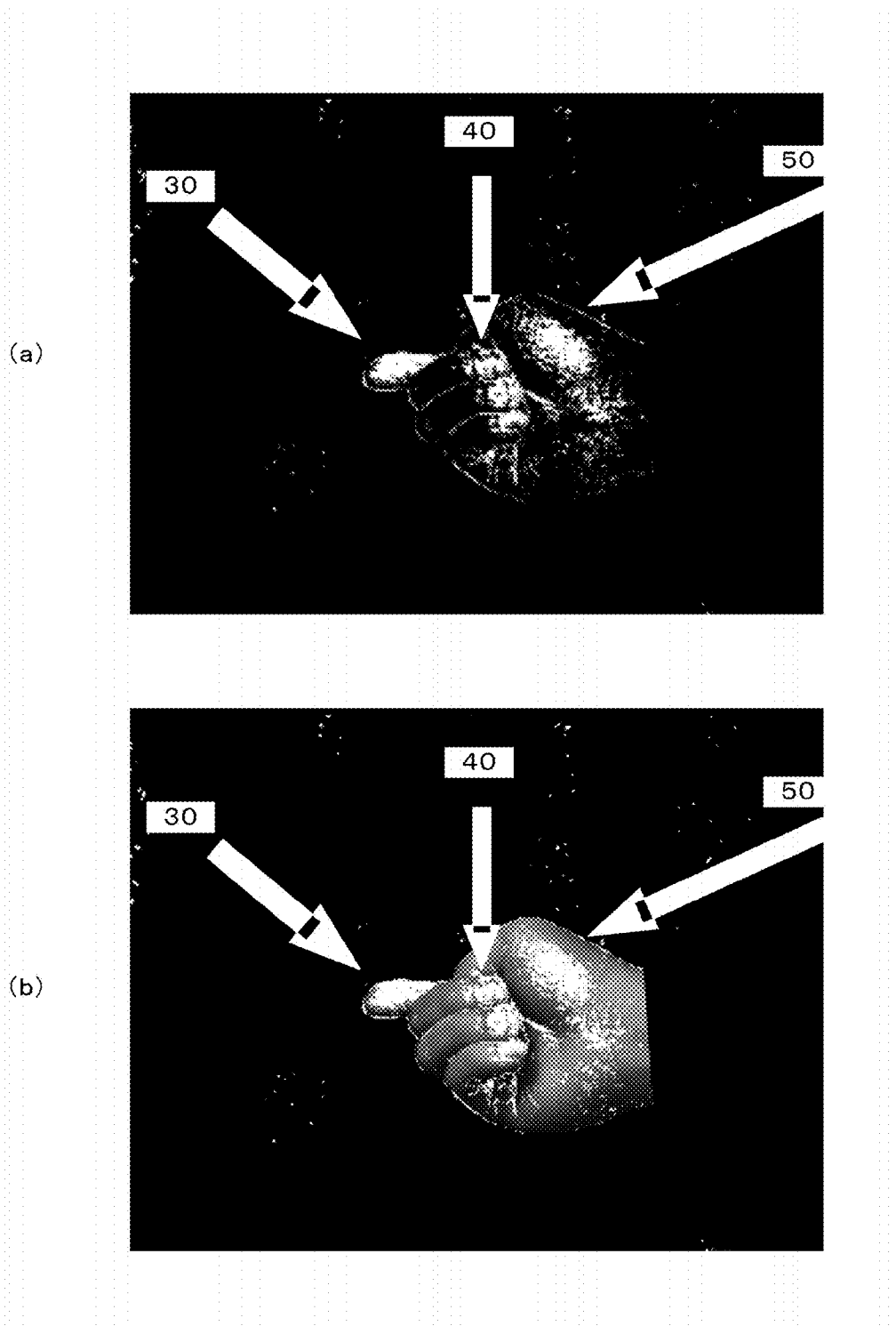
FIG. 15 is a view showing the plotting data region, in which data items equal to or greater than a fourth highest (minimum) threshold value in the HS coordinate system are plotted, according to the first embodiment.

FIG. 15 (a) is a distribution chart illustrating the tenth example, according to which only the plotting data items, for which the hue axis values are equal to or greater than the fourth threshold value SL20, are replotted in the second graph, among the plotting data items, when with respect to data items of the hand image in FIG. 10 (a), the fourth threshold value SL20 is set to the value further less than the third threshold value SL20 along the HUE axis shown in FIG. 14 (a).

FIG. 15 (b) is a view synthesized by overlapping the data items replotted in FIG. 15 (a) with the original data items of the hand image in FIG. 10 (a), because it is difficult to determine which data items of the hand image correspond to which positions in the distribution view, in which the data items are replotted as shown in FIG. 15 (a).

As known from FIGS. 15 (a) and 15 (b), a further more large number of data items of the nail 40 are replotted and form the plotting data region of the size approximate to the actual size shown in FIG. 14 (*a*), when the fourth threshold value SL20 is further less than the third threshold value SL 20; hence the plotting data region with the size slightly larger than that in FIG. 14 (*a*), is formed. However, it is still difficult to plot the plotting data regions with the sizes approximate to the actual sizes of the finger pulp 30 and the thenar 50; hence, the plotting data regions with the sizes relatively smaller than the actual sizes are formed.

Figure 16:
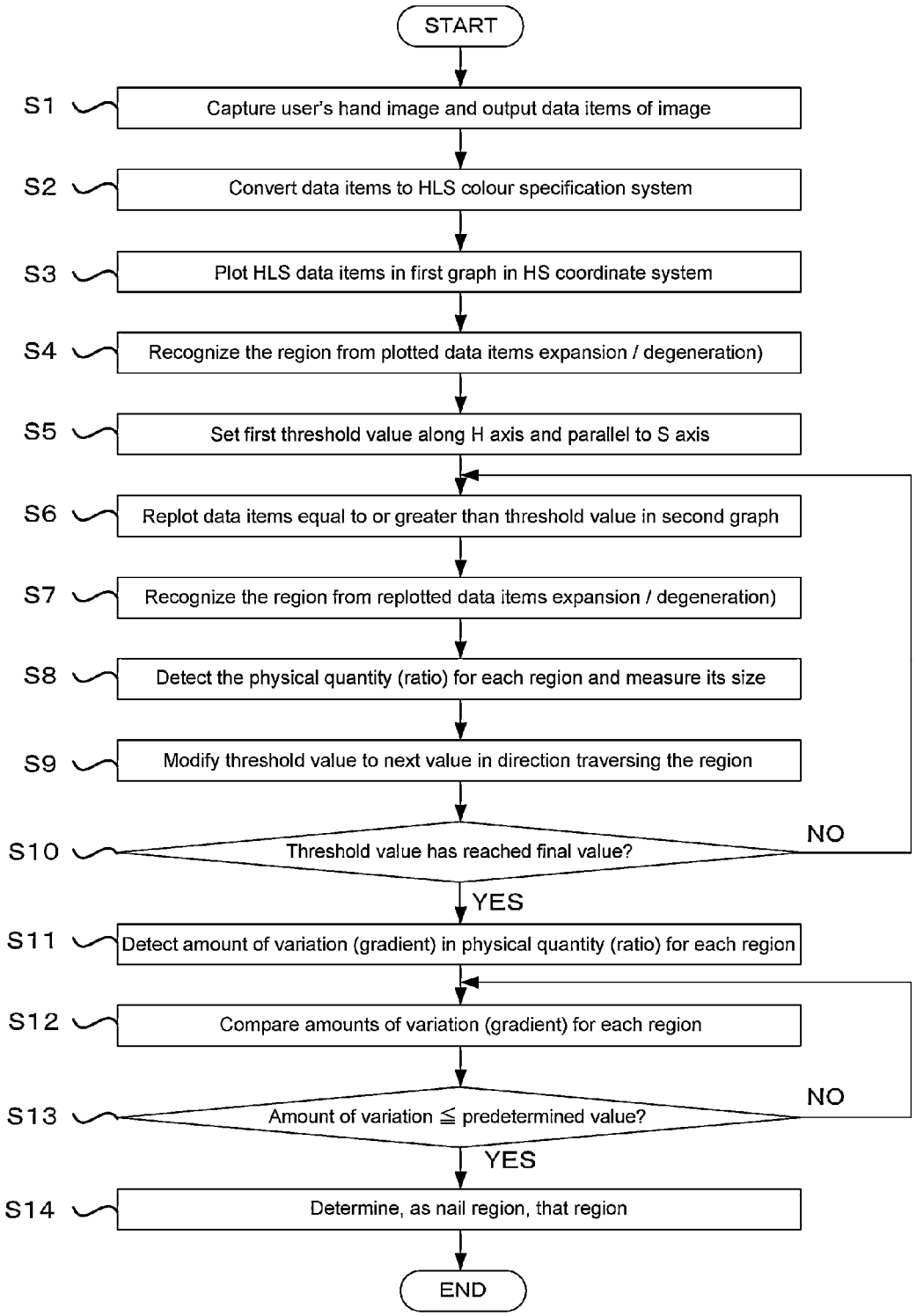
FIG. 16 is a flowchart illustrating the scheme of the method for detecting the plotting data items equal to or greater than the variable threshold value, and determining the nail region based on the gradient of the amount of variation in the region.

According to the nail region detection method of the present invention, as shown in FIG. 16, the data items on the image containing the user's hand captured by a colour camera 61 are output to an image data storage part 71 in an information processing part 70 (S1). The information processing part 70 is composed of a program storage part 72, from which the program is read out, and parts for implementing the present invention using an arithmetic device and a storage part. Next, at a colour specification system conversion plotting part 73, the data items on the captured image are converted from the RGB colour specification system used by the colour camera 61 to the predetermined HIS colour specification system, which are rendered based on three axes for three kinds of physical quantities (HLS) (S2). Moreover, at the colour specification system conversion plotting part 73, the converted HLS data items are plotted in the three-dimensional color spatial first graph in the HS coordinate system (S3).

Next, at the colour specification system conversion plotting part 73, more than one first plotting region is recognized by repeating expansion and degeneration operations on the data items in a plurality of data distribution charts, which are converted to and plotted in the HLS colour specification system (S4). After that, under the control of a repeat control part 77, a threshold setting part 74 sets the threshold values along the H axis, one of three axes, and parallel to other axes in the HLS colour specification system, with respect to the individual data items in the first plotting region (S5). Moreover, under the control of the repeat control part 77, a second plotting part 75 replots only the data items equal to or greater than the threshold values along the H axis in the first plotting region in the second graph (S6). Then, under the control of the repeat control part 77, a long axis detection part 76 recognizes a plurality of plotting regions using expansion and degeneration operations from the distribution charts replotted in the second graph (S7), and detects the long axes in the second plotting regions to measure the maximum length size along the long axis (S8).

Furthermore, the repeat control part 77 uses the threshold setting part 74 to vary the threshold to the next value in the direction traversing the first plotting region, for instance, to the next value on the side of the lower values when starting from the maximum value side, whereas to the next value on the side of the higher values when starting from the minimum value side (S9) and determines whether the threshold is final value or not (S10).

If the threshold value is not a final value (S10: NO), the repeat control part 77 repeats the process from the step S6 and if the threshold is the final value (S10: YES), the long axis detection part 76 detects the amount of variation (gradient) in maximum length along the long axis (S11). Then, the nail determination part 78 compares the amount of variation (gradient) in maximum length size along the long axis for each of the detected regions (S12) with the predetermined value to determine whether it is less than the predetermined value (S13). The nail determination part 78, if the amount of variation in maximum length size is equal to or less than the predetermined value, returns to the step 12 and compares the amount of variation (gradient) in maximum length size along the long axis with the predetermined value for each of detected regions, and if the amount of variation is less than the predetermined value, determines the region as the nail region (S14) and ends the process.

On the other hand, the data items of the image stored in the image data storage part 71 are also input in an approximate silhouette shape estimation part 91 similar to the conventional ones to estimate the approximate silhouette shape. The estimated approximate silhouette shape is synthesized with the nail region, which has been determined at the nail determination part 80, at the data synthetic part 79, and at a shape determination part 80, the hand shape is determined more accurately than the conventional methods based on the nail region and the approximate silhouette shape.

Figure 17:
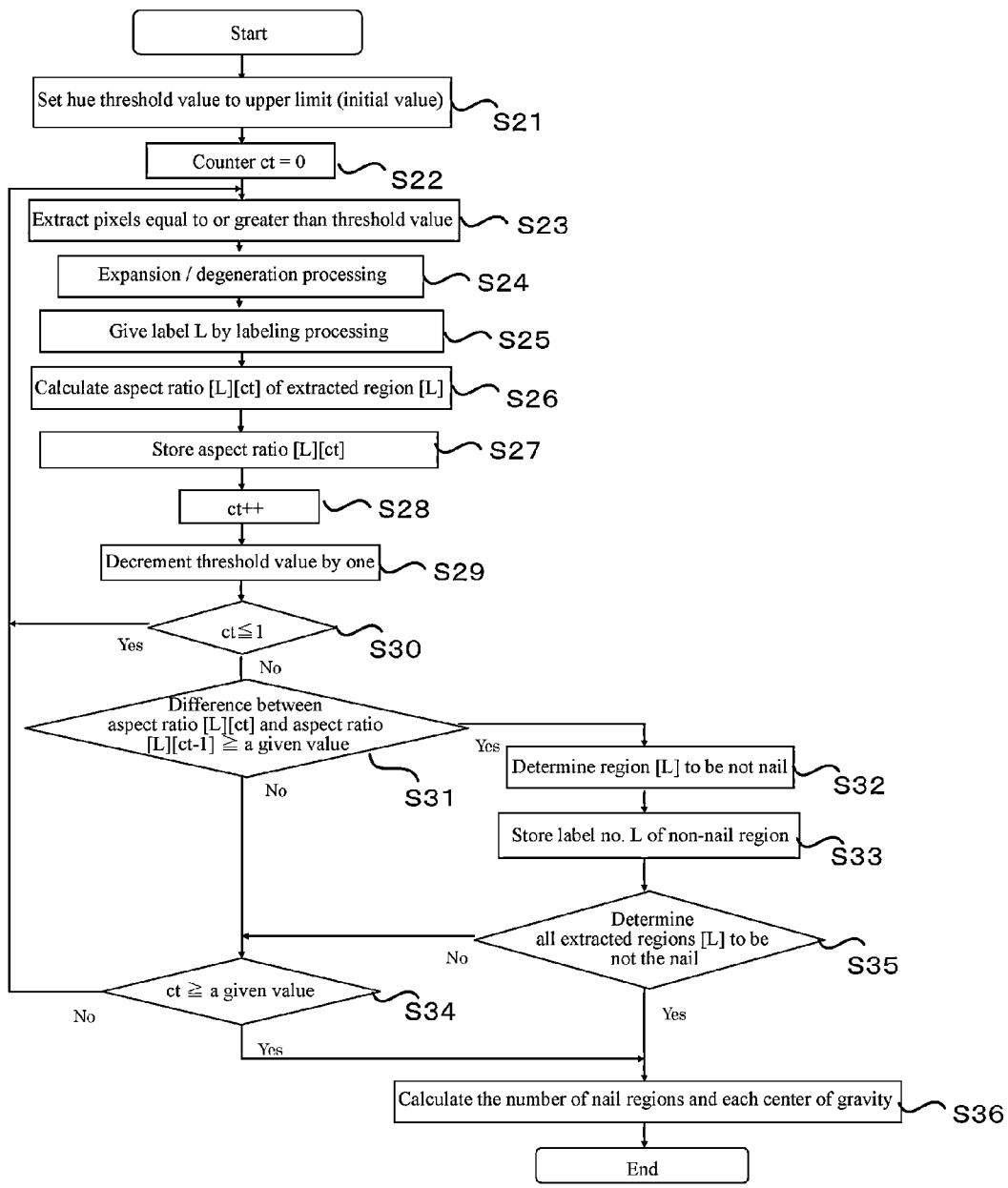
FIG. 17 is a flowchart illustrating a more elaborate method for detecting the plotting data items equal to or greater than the variable threshold, and determining the nail region based on the gradient of the amount of variation in the plotting region, according to the first embodiment.

A process that the amounts of variation in maximum values along the long axis equal to or greater than the variable threshold value in the plotting data regions in the steps S5 to S14 are compared, and if the amount of variation is equal to or less than the predetermined value, the region is determined as the nail region, is performed in the following process, which is illustrated in FIG. 17 in more detail.

Under the control of the repeat control part 77, the threshold setting part 74 initially sets the initial HUE threshold value to its upper limit (initial value) (S21) and resets a counter in the repeat control part 77 to 0 (zero) (S22). Under the control of the repeat control part 77, the second plotting part 75 extracts the pixels equal to or greater than the threshold from each of the plotting data items in the plotting regions (S23) and under the control of the repeat control part 77, a long axis detection part 76 repeats expansion and degeneration operations on each of the plotting data items equal to or greater than the threshold value, and zones the region L (S24).

Next, the nail determination part 78 puts a label on each of the zoned regions L (L indicates natural numbers) by labeling operation (S25); computes the aspect ratio of the extracted region L (S26); under the control of the repeat control part 77, increments the counter by one (S28); under the control of the repeat control part 77, the threshold setting part 74 decrements the threshold by one (S29); and the repeat control part 77 determines whether the value read out on the counter is equal to or less than 1 (one) (S30).

If the counter reads out the value equal to or less than 1 (one) in the step 30 (S30: YES), under the control of the repeat control part 77, the second plotting part 75 returns to the step S23, extracts the pixels equal to or greater than the threshold from the plotting data items in the plotting data region L (S23), and repeats the successive steps. If the counter reads out the value greater than 1 (one) in the step S30 (S30: NO), the difference between the aspect ratio for the current counter value in the region L and the aspect ratio for the directly-previous counter value in the region L is obtained, and it is determined whether the obtained difference between these aspect ratios is equal to or greater than the given value (predetermined value) or not (S31).

If the difference between the aspect ratios is equal to or greater than the given value (predetermined value) (S31: YES), the nail determination part 78 determines that the region L is not the nail region (S32), stores the label number L of the region, which is not the nail region, and determines whether each of all the extracted regions L is the nail region or not (S35).

If the difference between the aspect ratios is not equal to or greater than the given value (predetermined value) (S31: NO), the nail determination part 78 determines whether the value read out on the counter is equal to or greater than the given value (predetermined value) or not (S34), and if the value read out on the counter is the given value (predetermined value) (S34: NO), returns to the step 23 to extract the pixels equal to or greater than the threshold from the plotting data items in the plotting data region L(S23), and repeats the successive steps. If the value read out on the counter is not the given value (predetermined value) (S34: YES), the nail determination part 78 calculates the number of the nail regions and the individual centers of gravity (S36).

The nail determination part 78, if determining that each of all the extracted regions L is not the nail region (S35: YES), calculates the number of the nail regions and the individual centers of gravity (S36), whereas if determining that each of all the extracted regions L is the nail region (S35: NO), it determines whether the value read out on the counter is equal to or greater than the given value (predetermined value) (S34) and perform the successive steps.

Figure 18:
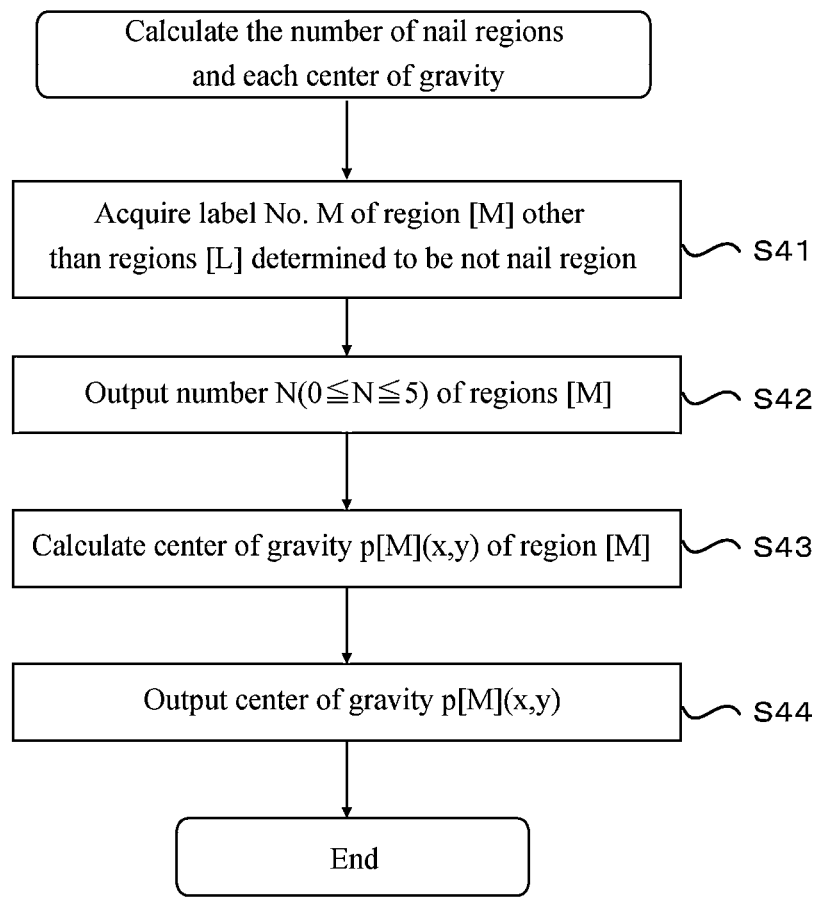
FIG. 18 is a flowchart illustrating the method for calculating the number of the nail regions determined, as shown in FIG. 17, according to the first embodiment, and a center of gravity.

The calculation of the number of the nail regions and the individual centers of gravity in the step S36 is performed in the following process, which is illustrated in FIG. 18 in more detail.

The nail determination part 78 obtains the label numbers "M" (M indicated natural numbers) of the regions other than the region L, which is determined to be not the nail region (S41), and outputs the number N of the regions M (0≤N≤5).

Moreover, the nail determination part 78 calculates the center of gravity p[M] (x,y) of the regions M (S43) and outputs the calculated center of gravity [M] (S44).

The nail region detection device of the present invention measures the maximum length size along the long axis in the second plotting region, in which only the replotted data items equal to or greater than the set threshold value are distributed, among the first plotting data items that are the data items of the captured image converted to the predetermined colour specification system first plotting data items, while varying the set threshold, and determines, as the nail region, the second plotting region, for which gradient of the amount of variation in maximum length size along the long axis is smaller than those in other regions. Since the gradient of the amount of variation in maximum length along the long axis in the plotting region converted in the predetermined colour specification system can be used to determine whether the plotting region is the nail region or not, the nail region can be recognized from the data items of the capture image more accurately than the conventional methods. Accordingly, the position information on the nail region can be obtained from the skin region of any user's hand image, the nail information can be effectively added to the silhouette shape information, and information on the individual nail positions can be effectively assigned to the silhouette shape information; therefore, the hand shape can be estimated more accurately. Thus, according to the nail region detection method of this embodiment, the nail region can be recognized from the data items of the captured image more accurately than the conventional method, the position information on the nail region can be obtained from the akin region of any user's hand image, the bail information can be effectively added to the silhouette shape information, and information on the individual bail positions can be effectively assigned to the silhouette shape information; accordingly, the hand shape can be estimated more accurately.

Embodiment 2

Figure 19:
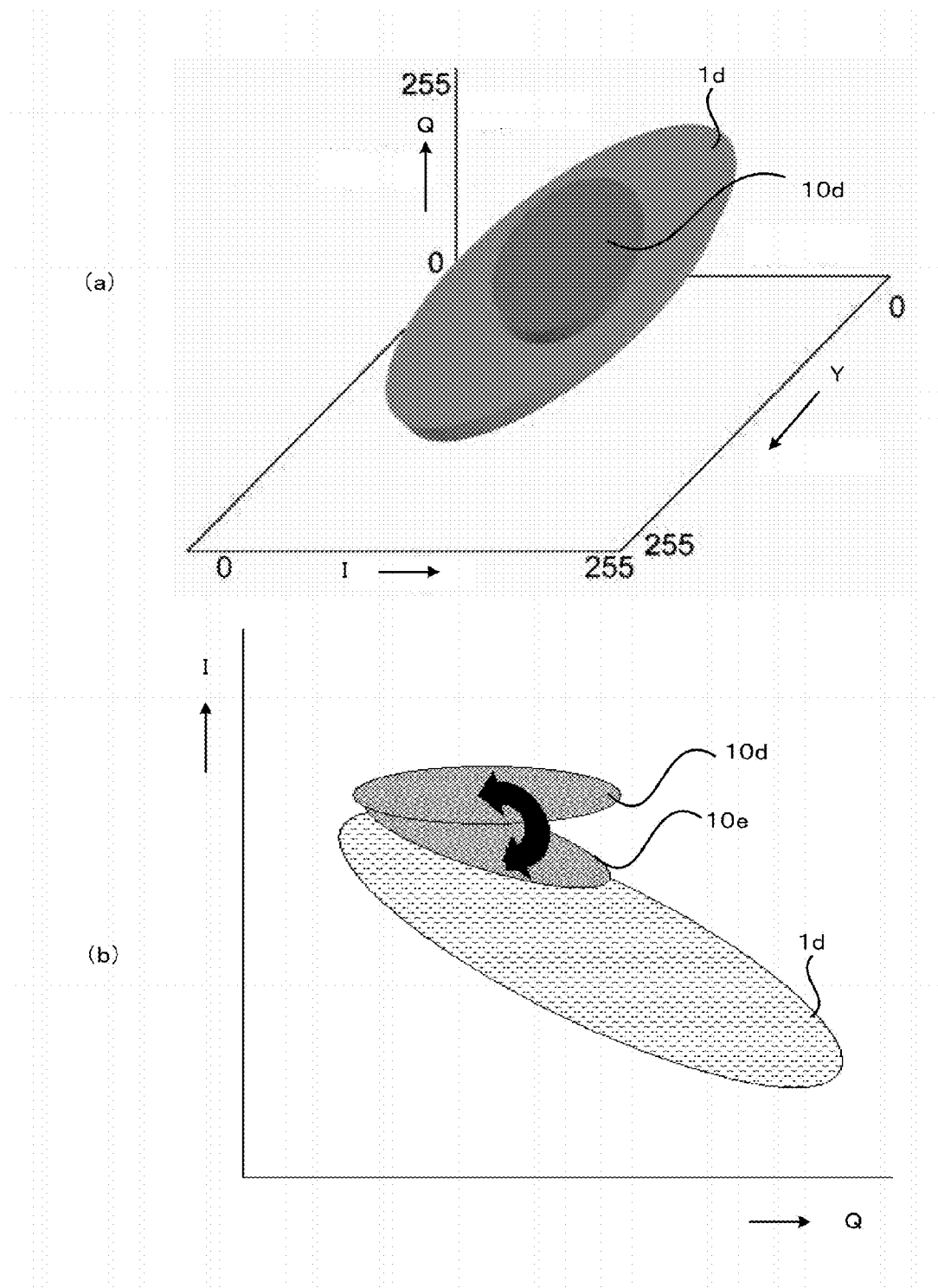
FIG. 19 is a view showing a difference between the data regions when the data items on the hand image is converted to the YIQ colour specification system, according to a second embodiment of the present invention.

FIGS. 19 (*a*) and 19 (*b*) are schematic distribution charts illustrating the second embodiment of the present invention, according to which the data items of the hand image are converted from the RGB colour specification system to the YIQ colour specification system, and two attributes, which do not cause the nail and the skin to overlap easily, are selected among three attributes in the YIQ colour specification system to map the data items of the image in the colour space to the data items of the image in the two-dimensional plane.

The YIQ colour specification system is composed of component signals used at the stage before NTSC signals are obtained. The hue component in the YIQ colour specification system is 33-degree-rotated relative to the chromatic components (Cb, Cr) of color-difference component signals and the I axis and the Q axis orthogonally intersect each other. In short, it is composed of the Y axis (luminance), the I axis (warm colour system: orange to light blue), and the Q axis (cool colour system: blue-purple to yellow-green).

It is known that even in the YIQ colour specification system in FIG. 19 (*a*), the skin region 1*b* and the nail region 10*d* tend to be distributed relatively apart from each other after the data items of the image in the three-dimensional colour space is mapped to the data items of the image in the tow-dimensional plane. However, compared with the HLS colour specification system according to the first embodiment as shown in FIGS. 1 to 18, in the YIQ colour specification system in FIG. 19 (*a*), the nail region 10*d* is distributed while revolving around a certain point; hence, the threshold SL20 along one axis, or the separating plane, is difficult to obtain.

Even in the YIQ colour specification system, as shown in FIG. 19 (*b*), the same effects as those according to the aforementioned first embodiment can be achieved by turning the orientation of the nail region 10*d* relative to the skin region 1*b* in the same manner as that for the nail region 15*d* so as to align two regions, in order to set the threshold value SL 20, which is not along one axis.

According to the aforementioned first and second embodiments, the nail region and the skin region are separated from each other by converting the RGB colour specification system used by the colour camera to capture the image to the HLS colour specification system or the YIQ colour specification system, whereas the colour specification system used to separate the nail region and the skin region from each other need not to be limited to the HLS specification system, provided that two regions, the nail region and the skin region, less overlap each other when the data items of the image in the three-dimensional colour space are mapped to the data items of the image in the two-dimensional plane.

Moreover, discrimination analysis may be used to obtain the long and short axes, instead of principal component analysis. This technique is used to obtain the criterion (discrimination function) for determining the group, to which newly-obtained data items are to be assigned if it is known that previously provided data items are assigned to different groups.

If an unknown hand image is input when shape data items on the nails, thenars, and finger pulps of the hand images of a plurality of subjects have been previously obtained, the region shape, which appear when the HUE axis threshold value is varied, may be assigned to its corresponding group based on the previous data items. According to this technique, the data items can be properly assigned to its corresponding group based on the previous data, even if the criterion for determining, for example, the variation in aspect ratio between the lengths along the long axis and the short axis, is not clearly defined.

Embodiment 3

According to the aforementioned first and second embodiments, the nail region is detected using the variation in length size along the long axis in the detected nail candidate region as shown in FIGS. 11 (a) to 11 (d). However, as described later, the nail candidate region detected according to the aforementioned first and second embodiments is not obtained in the shape approximate to an ideal ellipse or rectangle; hence, it is difficult to detect the length size along the axis in some cases.

It is also possible to detect the nail region from the skin region of the back of the hand using not only the variation in length size along the axis in the nail region but also the variation in the area of the nail candidate region or in the number of pixels in the region detected along the HUE axis. In this case, for instance, a relatively large difference between the hue (colour tone) values in both the skin region and the nail region on the side of the back of the hand, is used. It should be noted that the skin region and the nail regain on the side of the back of the hand can be relatively easily detected, whereas the skin region and the nail region of the side of the palm of the hand are not easily detected. This is because the finger pulp and the thenar have hue values close to the nail candidate region detected in the hue system; hence it is difficult to discriminate between the nail region, the finger pulp region, and the thenar region based only on the hue value, for instance, when the hand image contains not only the nail but also the finger pulp and the thenar.

Figure 20:
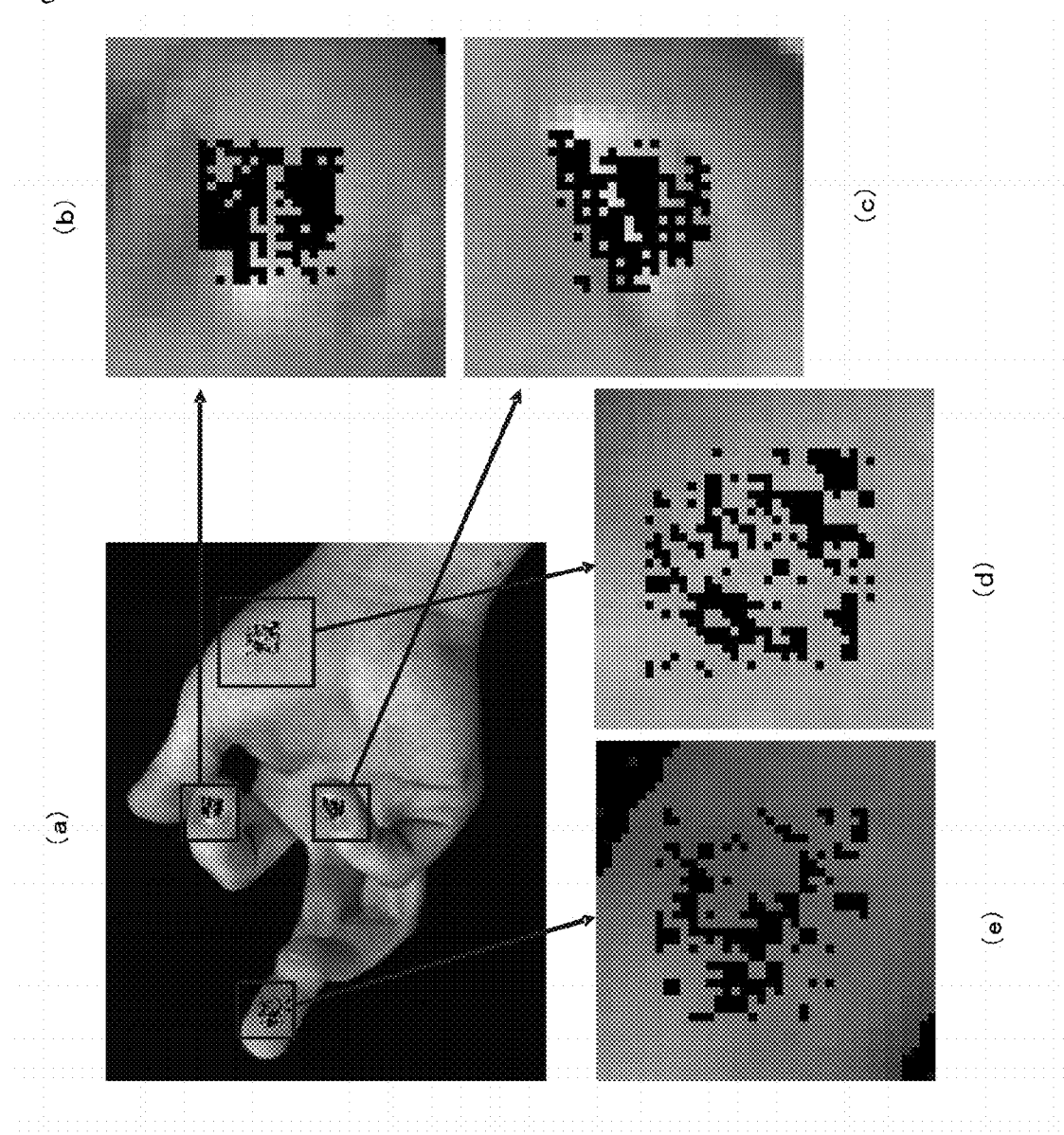
FIG. 20 is a view showing that the coarse distribution of candidate nails is not uniform.

The nail candidate region can be detected "by repeating expansion and degeneration operations on each of the plotted data items" as shown in the step 4 in FIG. 16. However, as described later, the nail candidate region detected according to the aforementioned first and second embodiments is not obtained in the shape approximate to an ideal ellipse or rectangle; hence, it is difficult to detect the length size along the axis in some cases. Moreover, the density of pixels (nail candidate pixels) is different for each nail candidate region having its own hue value for the nail region. The density of pixels depends on the orientation of the camera and the hand, as well as how the light illuminates on the hand as shown in FIGS. 20 (a) to 20 (e). Generally, the density of the nail candidate pixels tends to become high due to strong light reflection from the nail plate, and it may also become high in the finger pulp region and the thenar region, depending on the orientations of the camera and the hand, as well as how the light illuminates on the hand. Accordingly, even though the hue value and the density of the nail candidate pixels are combined, it is difficult to discriminate between the nail region, the finger pulp region, and the thenar region in some cases.

Example 1 of Embodiment 3

To address this problem, in a first example of the third embodiment of the present invention, at the first step, a smoothing processing is performed on an original image Oi for the nail candidate region detected based on the hue analogous to the nail to obtain the image in the dense region (dense image) Ci. In this case, this smoothing processing is performed, for instance, so that salt and pepper noises are removed with a median filter, which outputs the median value in the predetermined region as the concentration of the pixels of the center of the region, without blurring the edges. Provided that the condition, that the dense image Ci is preferably obtained, is met, it is possible to discriminate between the skin region and the nail region of the back of the hand based on the shape, area, and density of the pixels of the dense image Ci region.

Taking the nail for instance, a borderline surrounds its circumference, the difference in hue is clear between the nail region and the skin region of the back of the hand around it, and the difference in light reflectance is also clear between the nail plate and the back of the hand; accordingly, it is possible to detect the dense image Ci region of the nail region because it trends to have a shape approximate to the rectangle or ellipse compared with the dense image Ci regions of the finger pulp region and the thenar region, and have an area contained within the predetermined range corresponding to the area of the nail, and have a higher density of the pixels; provided that the conditions, that the orientations of the camera and the hand, as well as how the light illuminates on the hand are optimal, are met. On the other hand, it has been demonstrated that the dense images Ci of the finger pulp region and the thenar region may not be detected in some cases, because the dense images Ci of them may have the shape, area, density, etc., analogous to those of the dense image Ci of the nail region if the conditions that the orientations of the camera and the hand, as well as how the light illuminates on the hand are optimal, are not met.

To address this problem, in the first example, as the second step, the original image Oi of the nail candidate region is repeatedly obtained with the hue threshold varied, the amount of variation in area or number of pixels is calculated between the original images Oi, and the calculated variation obtained in each processing is used to detect the nail region. In this case, the amount of variation in area or number of pixels within the dense image Ci region of the nail region is small. This is because a clear boundary exists between the nail and the skin around it as described before and the differences in hue and luster are relatively large between them. On the other hand, the amounts of variation in area or number of pixels within the dense image Ci regions of the finger pulp region and the thenar region are large. This is because no clear boundary exists between the finger pulp region or the thenar region, and the skin around it; the hue and luster changes gradually; the differences in hue and luster are relatively small; and the amount of variation in area or number of pixels of the dense image Ci region becomes large. Accordingly, even though the orientations of the camera and the hand, as well as how the light illuminates on the hand are not optimal, it is possible to detect the nail region.

As mentioned above, in the first example, it is possible to discriminate the nail region from the finger pulp region and the thenar region based on the small amount of variation in area of the dense image Ci region of the nail region and the large amount of variation in areas of the dense image Ci regions of the finger pulp region and the thenar region, assuming that the physical quantity or its ratio in the second plotting region is an area, and the area is the area of the dense region image in the second plotting region. Moreover, in the first example, it is possible to discriminate the nail region from the finger pulp region and the thenar region based on the small amount of variation in number of the pixels of the dense image Ci region of the nail region and the large amount of variation in the amounts of variation in numbers of the pixels of the dense image Ci regions of the finger pulp region and the thenar region assuming that the physical quantity in the second plotting region is the number of pixels, and the number of pixels is the number of the pixels of the dense region image in the second plotting region.

Example 2 of Embodiment 3

Furthermore, in a second example of the embodiment 3 of the present invention, the method for detecting the nail using the coarse image Si was considered, assuming that the remaining image (in the coarse region) obtained by removing the dense image Ci from the original image Oi is a coarse image Si. In this case, it is also possible to discriminate the skin region and the nail region on the back of the hand based on the shape, area, density of the pixels, etc., of the coarse image, provided that the condition, that the coarse image Si is preferably obtained, is met.

Accordingly, provided that the conditions, that the orientations of the camera and the hand, as well as how the light illuminates on the hand are optimal, are met, it is possible to detect the nail region, because the coarse image Si region of the nail region is contained only in the vicinity of the borderline surrounding the nail; the coarse image Si region of the nail is shaped like a rectangle or ellipse analogous to the nail compared with the coarse image Si regions of the finger pulp region and the thenar region; and the area tends to be contained within the predetermined narrow range surrounding the nail. However, if the conditions, that the orientations of the camera and the hand, as well as how the light illuminates on the hand are optimal, are not met, the coarse image Si regions of the finger pulp region and the thenar region may have a shape and area analogous to those of the nail region; hence the nail region cannot be detected in some cases.

To address this problem, in the second example, as the second step, the original image Oi of the nail candidate region is repeatedly obtained with the hue threshold varied, the amount of variation in area or number of pixels is calculated between the original images Oi, and the calculated variation is used to detect the nail region. In this case, the amount of variation in area or number of pixels within the coarse image Ci region of the nail region is small. This is because a clear boundary exists between the nail and the skin around it as described before. On the other hand, the amounts of variation in area or number of pixels within the dense image Ci regions of the finger pulp region and the thenar region are large. This is because with respect to the finger pulp region or the thenar region, the amount of variation in area or number of pixels of the coarse image Si region becomes large for the reason that no clear boundary exists between these regions and the skin around them the hue and luster changes gradually; the differences in hue, and luster are relatively small. Accordingly, even though the conditions, that the orientations of the camera and the hand, as well as how the light illuminates on the hand are optimal, are not met, it is possible to detect the nail region.

As mentioned above, in the second example, it is possible to discriminate the nail region from the finger pulp region and the thenar region based on the small amount of variation in area of the coarse image Si region of the nail region and the large amount of variation in the amounts of variation in areas of the coarse image Si regions of the finger pulp region and the thenar region, assuming that the physical quantity or its ratio in the second plotting region is an area, and the area is the area of the dense region image in the second plotting region. Moreover, in the second example, it is possible to discriminate the nail region from the finger pulp region and the thenar region based on the small amount of variation in number of the pixels of the coarse image Si region of the nail region and the large amount of variation in the amounts of variation in numbers of the pixels of the coarse image Si regions of the finger pulp region and the thenar region, assuming that the physical quantity in the second plotting region is the number of pixels, and the number of pixels is the number of the pixels of the dense region image in the second plotting region.

Example 3 of Embodiment 3

Moreover, in a third example of the embodiment 3 of the present invention, the method for detecting the nail using the aforementioned ratio between the dense image Ci region and the coarse image Si region was considered. In this case, provided that the condition, that the dense image Ci region and the coarse image Si region are preferably obtained, is met, it is possible to discriminate the skin region and nail region on the side of the back of the hand, because with respect to the nail region, the ratio between the coarse image Si region and the dense image Ci region is smaller than those of the finger pulp region and the thenar region.

As mentioned above, provided that the conditions, that the orientations of the camera and the hand, as well as how the light illuminates on the hand are optimal, are met, it is possible to detect the nail region, because the ratio between the dense image Ci region and the coarse image Si region of the nail to be contained within the predetermined range, for the reason that the dense image Ci region of the nail gets shaped relatively like a rectangle or an ellipse, the region area or the number of pixels in the region is contained within the predetermined range, and as a result, with respect to the coarse image Si region obtained by removing the dense image Ci from the original image Oi, the region area or the number of pixels in the region is also contained within the predetermined range. However, it has been demonstrated that if the conditions, that the orientations of the camera and the hand, as well as how the light illuminates on the hand are optimal, are not met, the ratio between the dense image Ci regions and the coarse image Si regions of the finger pulp region and the thenar region may be approximate to that of the nail region; hence the nail region cannot be detected in some cases.

To address this problem, in the third example, as the second step, the original image Oi of the nail candidate region is repeatedly obtained with the hue threshold varied, the amount of variation, obtained in each processing, in ratio between the region area or the number of pixels of the dense image Ci and the region area or the number of pixels of the coarse image Si region is calculated, and the calculated amount of variation is used to detect the nail region. In this case, with respect to the nail region, the amount of variation in ratio between the region areas of the dense image Ci region and the coarse image Si region is small, and the amount of variation in ratio between the numbers of pixels of the dense image Ci region and the coarse image Si region is also small. On the other hand, with respect to the finger pulp region and the thenar region, the amount of variation in ratio between the region areas of the dense image Ci region and the coarse image Si region is large and the amount of variation in ratio between the numbers of pixels of dense image Ci region and the coarse image Si region is also large; accordingly, it is possible to detect the nail region even though the conditions, that the orientations of the camera and the hand are optimal, are not met.

Accordingly, in the third example, it is possible to discriminate the nail region from the finger pulp region and the thenar region, assuming that the physical quantity or its ratio in the second plotting region is the ratio between the physical quantities, and the ratio is the ratio between the areas of the dense image Ci region and the coarse image Si region, because the amount of variation in ratio between areas of the dense image Ci region and the coarse image Si region of the nail region is small, for the reason that the amount of variation in area of the dense image and the coarse image of the nail region is small, and no difference in variation pattern of areas of the regions exerts influence, whereas the amount of variation in ratio between areas of the dense image Ci region and the coarse image Si region of the nail region is large, for the reason that the amounts of variation in area of the dense image and the coarse image of the nail region are large, and a difference in variation pattern of areas of the regions exerts.

Moreover, in the third example, it is possible to discriminate the nail region from the finger pulp region and the thenar region, assuming that the physical quantity or its ratio in the second plotting region is the ratio between the physical quantities and the ratio is the ratio between the numbers of pixels of the dense image and the coarse image of the second plotting region in the second plotting region, because the amount of variation in ratio between the numbers of pixels of the dense image Ci region and the coarse image Si region of the nail region is small, for the reason that the amount of variation in number of pixels of the regions is small and no difference in variation pattern of number of pixels of the regions exert influence, whereas the amounts of variation in ratio between the numbers of pixels of the dense image Ci region and the coarse image Si region of the finger pulp region and the thenar region are large, for the reason that the amount of variation in number of pixels of the regions is large and an difference in variation pattern of number of pixels of the regions exert influence.

Figure 21:
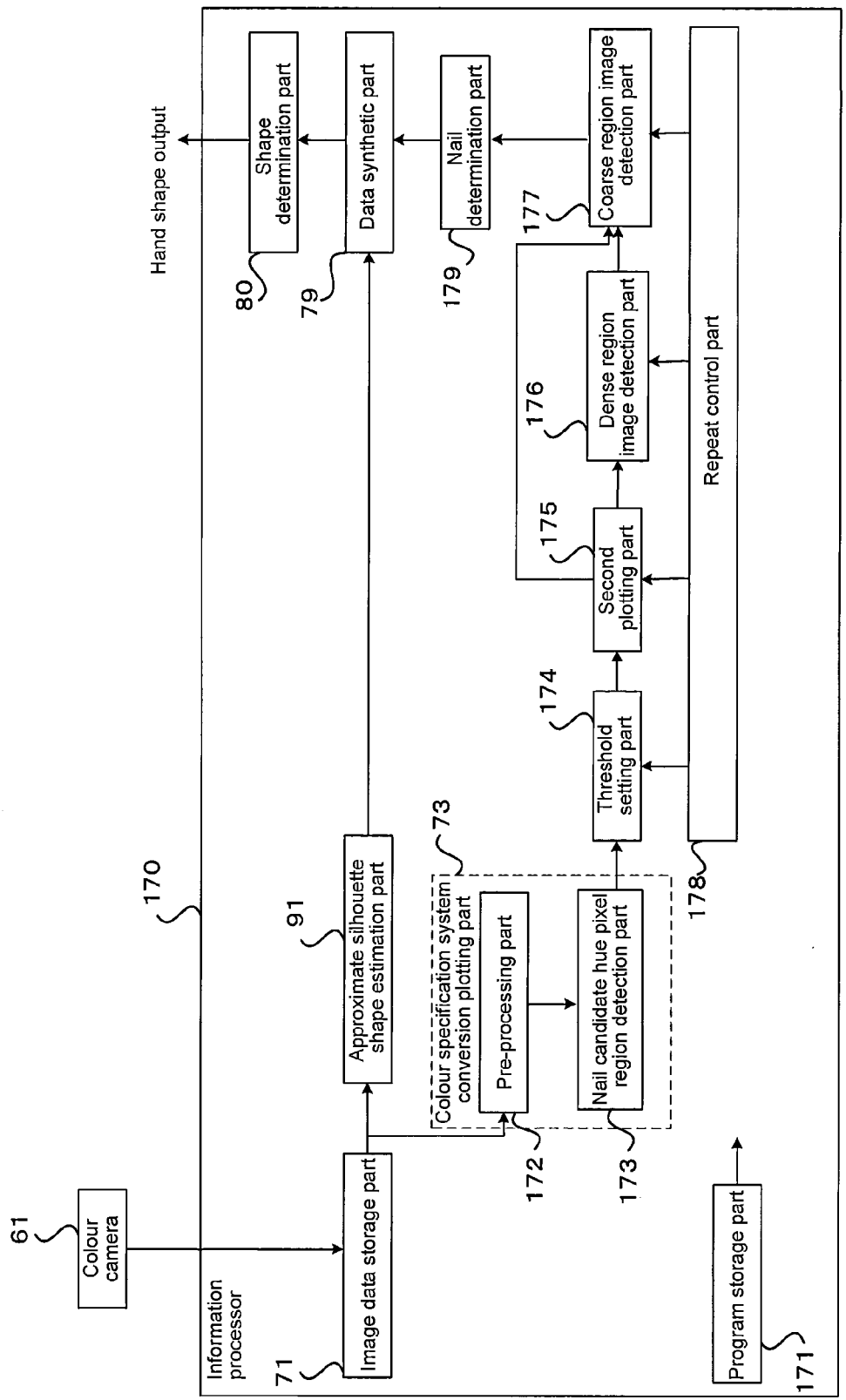
FIG. 21 is a block diagram showing a hardware configuration, according to a third embodiment of the present invention.

Since the nail region detection device according to the third embodiment of the present invention shown in FIG. 21 has the same hardware configuration as the nail region detection device according to the first embodiment with the exception that part of it has been modified, the explanation of the same parts as those of the nail region detection device according to the first embodiment is omitted by giving the same signs to them, and only the modified parts are explained. Specifically, the explanations of the colour camera 61, the image data storage part 71, the data synthetic part 79, the shape determination part 80, and the approximate silhouette shape estimation part 91 are omitted because they are the same as those according to the first embodiment. The explanation of the approximate silhouette shape estimation part 91 is omitted because it is the same as the estimation part according to the first embodiment. In the following paragraphs, in the light of differences from the first embodiment, the method for discriminating the nail region from the finger pulp region and the thenar region based on the amount of variation in ratio between the numbers of pixels in the regions, is described.

An information processing part 170 has a configuration capable of performing the nail region detection method according to this third embodiment on the input colour image data, which is approximately the same as the configuration according to the first embodiment with a main difference in the part for detecting the nail region, and may be adapted to this embodiment. The program storage part 171 according to the third embodiment stores the program to be executed for implementing the third embodiment at the information processing part 70, approximately in the same manner as that according to the first embodiment, and the program may be adapted to the third embodiment, because of its difference from the program according to the first embodiment.

A colour specification system conversion plotting part 73 has a pre-processing part 172 and a nail candidate hue pixel region detection part 173. The nail candidate hue pixel region detection part 173 converts the data items of the image captured by the colour camera in the RGB colour specification system to the HLS colour specification system, and plots the converted data items in the three-dimensional colour spatial first graph. FIG. 2 (c) and FIGS. 3 (b) to 8 (b) show the appearance in the first plotting region, in which the data items converted to the HLS colour specification system have been plotted in the three-dimensional spatial first graph in the HLS coordinate system.

The pre-processing part 172 performs the processing for removing external edges from the image, at which noises are prone to generate and/or the processing for alleviating the shadow influence. The processing for removing the external edges is performed by, for instance, assigning the group attribute to each of the pixel data items of the regions in the first plotting region using the labeling processing, and then deleting two pixel data items inward (in the direction of depth) from its outline toward the center from the pixel data items of the same group of the hand region. In this case, the depth, down to which the pixels are deleted, may be larger than the value 2. However, according to the third embodiment, the minimum value for removing the external edges shall be 2. This is because, for instance, the accuracy of nail detection may be deteriorated by deleting the pixel data items to remove the external edges, for the reason that only part of the nail region is captured and the remaining regions are not captured, which causes the pixel data items to be decreased when the nail image is captured from an oblique direction with the forearm (wrist) turned relative to the camera.

On the other hand, the processing for alleviating the shadow influence is performed, for instance, by performing γ correction locally on the pixel data items of the hand region in the first plotting region. Assuming that the criterion for performing γ correction on the pixel data item, is determined by, for instance, 8-bit red value, γ correction on the pixel data items can be represented by the following three expressions.

[Math. 2]

$$R' = \begin{cases} 0 & (R \leq 20) \\ \left(\frac{R}{100}\right)^{\frac{1}{\gamma}} \times 100 & (20 < R \leq 100) \\ R & (R > 100) \end{cases} \quad (1)$$

[Math. 3]

$$G' = \begin{cases} 0 & (R \leq 20) \\ \left(\frac{G}{100}\right)^{\frac{1}{\gamma}} \times 100 & (20 < R \leq 100) \\ G & (R > 100) \end{cases} \quad (2)$$

[Math. 4]

$$B' = \begin{cases} 0 & (R \leq 20) \\ \left(\frac{B}{100}\right)^{\frac{1}{\gamma}} \times 100 & (20 < R \leq 100) \\ B & (R > 100) \end{cases} \quad (3)$$

Where, R', G', and B' are pixel values for R, G, and B, respectively, after γ correction is performed. Moreover, y=1.3 may be used for the γ value to avoid locally unnatural colour even after y correction is performed.

The nail candidate hue pixel region detection part 173, as mentioned above in the first embodiment by reference to FIG. 1 and FIGS. 2 (a) to 2 (c), converts the data items on the captured image in the RGB colour specification system shown in FIG. 2 (b) to the HLS colour specification system shown in FIG. 2 (c), and then plots them in the three-dimensional colour spatial first graph to form the first plotting region. In this first plotting region, the nail region 10b and the skin region 1b can be separated using a plane perpendicular to the H axis and parallel to the L axis as shown in FIG. 3 (b), FIG. 4 (b), FIG. 6 (b), and FIG. 7 (b). This suggests that the data items on the image in the nail region 10b and the data items on the image in the skin region 1b can be separated using the H axis threshold value.

Figure 22:
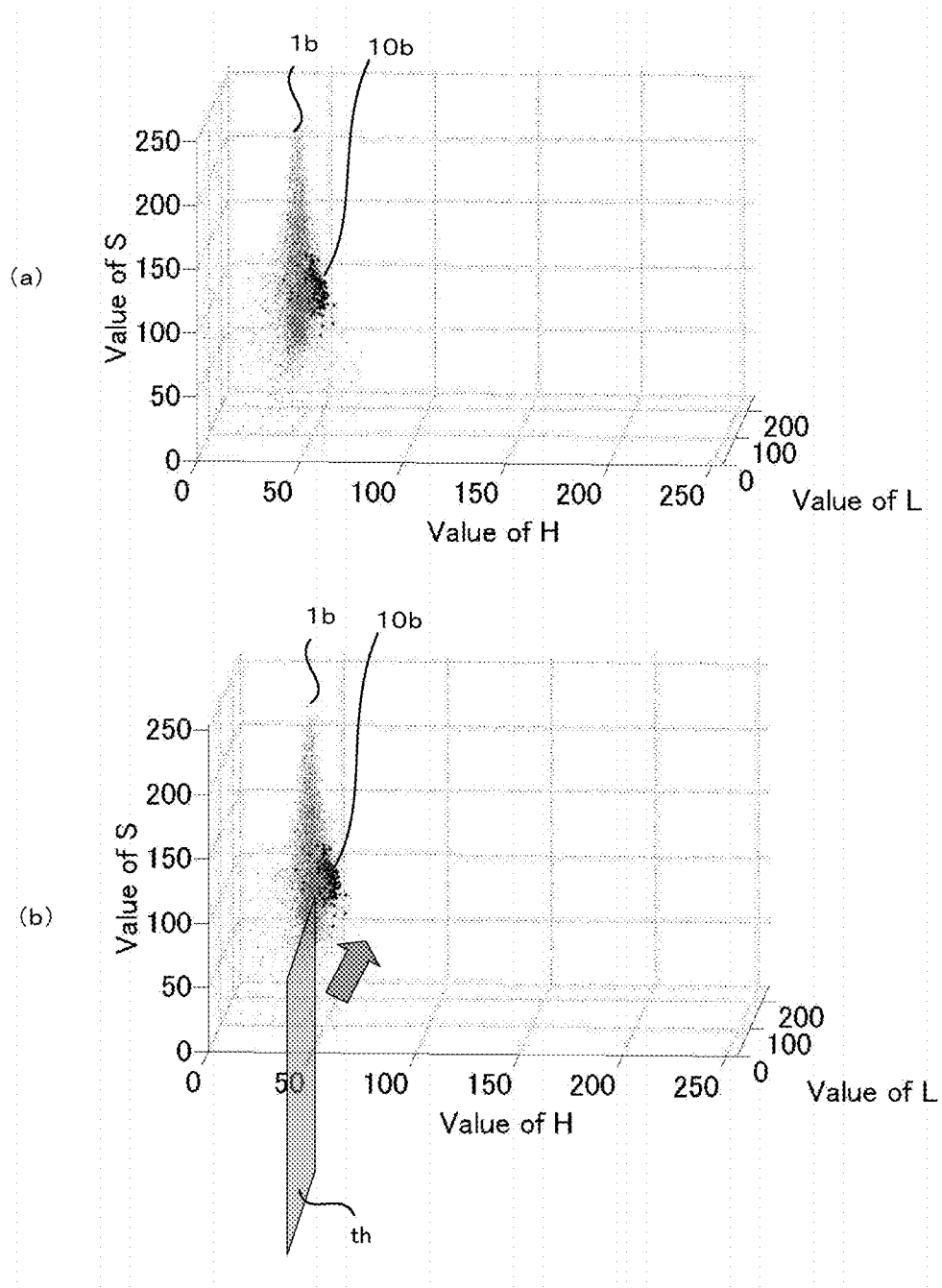
FIG. 22 is a view showing the data items on the image converted to the HLS colour specification system, according to the third embodiment.

As a clue to understand this principle, FIG. 22 (a) shows a process that the data items on the image in the nail region 10b and the image data items of the skin region 1b, both of which have been converted to the HLS colour specification system, are separated on the upper side and the lower side of the H axis threshold value th, respectively; hence, as known from FIG. 22 (a), the data items on the image in the nail region 10b and the data items on the image in the skin region 1b can be separated by inserting the plane (separation plane), which is at the H axis threshold value th, and is perpendicular to the H axis and parallel to the L axis, as shown in FIG. 22 (b).

As shown in FIGS. 22 (a) and 22 (b), the data items on the image in the nail region 10b and the data items on the image in the skin region 1b overlap partially each other in the pixel distribution. In FIGS. 22 (a) and 22 (b), the data (pixel) items on the image in the skin region 1b have been plotted in light grey, and the data (pixel) items on the image in the nail region 10b have been plotted using slightly large block dots. In the region, in which the data (pixel) items on the image in the skin region 1b and the data (pixel) items on the image in the nail region 10b overlap each other, some data (pixel) items on the image in the skin region, of which colour tone is analogous to the nail, exist. Among the data (pixel) items on the images of the finger pulp and the thenar, only the data (pixel) items on the image, of which colour tone is analogous to the nail, is increased in amount.

The plane, which is at the H axis threshold value th and is perpendicular to the H axis and parallel to the L axis, shown in FIG. 22 (b), is varied in the direction traversing the skin region 1b and the nail regions 10b along the H axis by setting the initial value on the outside of the maximum value or the minimum value of the nail region 10b or the skin region 1b as described before by reference to FIG. 9 (b), which show the appearance of the regions after being mapped to the plane in the two-dimensional HS coordinate system. This processing is performed at the threshold setting part 174 under the control of the repeat control part 178.

The repeat control part 178, in the same manner as that of the repeat control part 77 according to the first embodiment, varies the threshold value th to the next value along the H axis in the direction traversing the first plotting region, for instance to the next value on the side of lower values when starting from the maximum side, or to the next value on the side of higher values when staring from the minimum side, and controls the threshold setting part 174, the second plotting part 175, the dense region image detection part 176, and the coarse region image detection part 177, while determining whether the threshold value th reaches the final value or not.

Next, under the control of the repeat control part 178, the second plotting part 175 replots only the plotting data items equal to or greater than the H axis threshold value th in the first plotting region in the second graph, and outputs the replotted data in the second plotting region equal to or greater than the threshold th in the second plotting region to both the dense region image detection part 176 and the coarse region image detection part a 177 at the subsequent stage. This processing is repeated with the H axis threshold th varied. The data items in the second plotting region for each H axis threshold value th, are varied as shown in, for instance, FIG. 12 (a), FIG. 13 (a), FIG. 14 (a), and FIG. 15 (a).

Next, under the control of the repeat control part 178, the dense region image detection part 176 performs labeling processing on the data items in the second plotting region equal to or greater than the threshold value th, for instance, after the region binding processing and the noise removal processing by median smoothing in the 11×11 regions. Through this processing, the dense image regions i of the nail candidate hue pixels, for which hue are analogous to the nail, and the center of gravity of each of the dense image regions i can be obtained.

Figure 23:
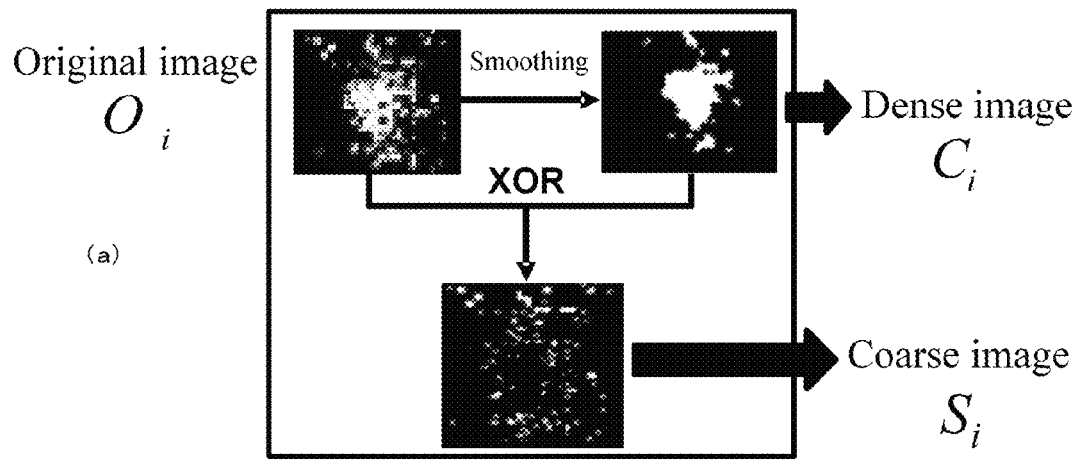
FIG. 23 is an explanatory drawing of the method, according to the third embodiment.

Next, under the control of the repeat control part 178, the coarse region image detection part 177 performs exclusive OR operation using, as the data items on the original image, the data items of each of dense image regions i obtained at the dense region image detection part 176 and the data items in the second plotting region, to detect the data items in the coarse image region. The obtained data items in the coarse image region are output together with the data items in the dense image region to the nail determination part 179 at the subsequent stage. FIG. 23 (a) illustrates this step.

[Math. 5]

$$S_i = O_i \oplus C_i \quad (4)$$

Where, Oi is an original image, Ci is a dense image, and Si is a coarse image.

Next, the nail determination part 179 calculates the ratio between the number of the pixels of the dense image and the number of the pixels of the coarse image for each H axis threshold value, from both the data items in the dense image region i and the data items in the coarse image region, which are input for each of the regions of the original image and for the H axis threshold value, using the following expression. The calculated ratio is the amount of characteristic for each of the threshold values.

[Math. 6]

$$\frac{N_s^i}{N_c^i} = par_{th}^i \quad (5)$$

Where, $N_c^i$ is the number of the pixels in the dense image, $N_s^i$ is the number of the pixels in the coarse image, and $par_{th}^i$ is the ratio between the areas of the dense image of the coarse image in the region i at the threshold value $par_{th}^i$.

During the above processing, since under the control of the repeat control par 178, the threshold setting part 174 sets two or more threshold values th for the separation plane between the data items on the image in the nail region 10b and the data items on the image in the skin region 1b, the nail determination part 179 calculates $par_{th}^i$, which is the ratio between the areas of the regions i obtained for each of the threshold values th. At that time, since the gradient of the hue is different between the nail region, and the thenar region or the finger pulp region in each of the regions i, as shown in FIGS. 11 (a) to 11 (c), the ratio $par_{th}^i$ between the areas in the regions i does not greatly vary for each of the threshold values in the nail region, whereas the ratio $par_{th}^i$ between the areas in the regions i varies greatly in the thenar region and the finger pulp region.

It should be noted that the method for implementing the third embodiment using the amount of variation in ratio between the numbers of the pixels in the dense region and the coarse region has been described above; however, it can be implemented by the same method as above or the above method partially simplified/removed, using any of: the amount of variation in number of the pixels in the dense image region; the amount of variation in number of the pixels in the coarse image region; the amount of variation in ratio between the areas of the dense region and the coarse region; the amount of variation in area of the dense region; and the amount of variation in area of the coarse region.

EXPLANATION OF REFERENCE NUMBER

1 Hand image
1a (RGB colour specification system) skin region
1b (HLS colour specification system) skin region
1d (YIQ colour specification system) skin region
10 Nail image
10a (RGB colour specification system) nail region
10b, 10c (HLS colour specification system) nail region
10d (YIQ colour specification system) nail region
30 Finger pulp
30a, 31, 32, 33, 34 Second plotting region (of the finger pulp 30)
40 Nail
40a, 41, 42, 43, 44 Second plotting region (of the nail 40)
50 Thenar
50a, 51, 52, 53, 54 Second plotting region (of the thenar 50)
61 Colour camera
70 Information processor
71 Image storage medium
72, 171 Program storage medium
73 Colour specification system conversion plotting part
74, 174 Threshold setting part
75, 175 Second plotting part
76 Long axis detection part
77, 178 Repeat control part
78, 179 Nail determination part
79 Data synthetic part
80 Shape determination part
172 Pre-processing part
173 Nail candidate hue pixel region detection part
176 Dense region image detection part
177 Coarse region image detection part
LA30 Long axis (of the finger pulp 30)
LA40 Long axis (of the nail 40)
LA50 Long axis (of the thenar 50)
SA30 Short axis (of the finger pulp 30)
SA40 Short axis (of the nail 40)
SA50 Short axis (of the thenar 50)
SL20 Threshold value (of the nail 40)
SL21 Threshold value (of the finger pulp 30 or thenar 50)

The invention claimed is:

1. A nail region detection method comprising at least:
repeating, several times, a step of mapping a first plotting region, which is obtained by plotting and converting the image data of a hand image captured by a colour camera in a three-dimensional colour spatial first graph, in a two-dimensional planar second plotting region, while varying a threshold value in line with a value along one axis of the three-dimensional colour space;
detecting at least one physical quantity or its ratio in the two-dimensional planar second plotting region at each of the mapping steps; and
determining, as a nail region, the second plotting region, in which the gradient of the amount of variation, when the physical quantity or its ratio is varied at each of the mapping steps, is less than a predetermined value.

2. A nail region detection method comprising:
a first step of converting data on an image containing the user's hand captured by a color camera from a colour specification system used by the color camera to a predetermined colour specification system, in which data items are represented by three axes for three kinds of physical amounts, different from the colour specification system used by the color camera and plotting the same in a three-dimensional first graph;
a second step of setting the threshold value, in line with the value for one of three axes and in parallel with other two axes, with respect to more than one plotting region, where the data items converted to and plotted in the predetermined colour specification system are distributed;
a third step of replotting only the plotting data items equal to or greater than the threshold value along the one axis in the first plotting region in the second graph in the two-dimensional plane orthogonally intersecting the one axis at the threshold to form a second plotting region;
a fourth step of detecting at least one physical quantity or its ratio in a plurality of second plotting regions in the second graph;
a fifth step of repeating the third and fourth steps while varying the threshold value along the one axis in the second step in the direction traversing the first plotting region; and
a sixth step of detecting the amount of variation in physical quantity or its ratio in the second plotting region obtained for each threshold value in the fifth step and determining, as a nail region, the second plotting region, in which the gradient of the amount of variation is equal to or less than a predetermined value.

3. The nail region detection method according to claim 2, wherein the first step contains at least a sub-step of performing a predetermined pre-processing, including external edge removal and shadow influence removal, on the data on the captured image, and a sub-step of detecting, as the first plotting region, the skin region containing a nail candidate hue pixel region, in which the hue is analogous to the nail.

4. The nail region detection method according to claim 2, wherein the ratio of the physical quantity or its ratio in the second plotting region is a length size along at least one axis in the fourth and sixth steps.

5. The nail region detection method according to claim 4, wherein the length size along the axis is the length size along the long axis, which is the maximum size in the fourth and sixth steps.

6. The nail region detection method according to claim 2, wherein the physical quantity or its ratio in the second plotting region is an area in the fourth and sixth steps.

7. The nail region detection method according to claim 6, wherein the area in the second plotting region is the area of the image in a dense region with dense pixels, after performing a processing for smoothing the second plotting region in the fourth and sixth steps.

8. The nail region detection method according to claim 6, wherein the area in the second plotting region is the area of a coarse region obtained by removing the dense region with dense pixels after performing the smoothing processing on the second plotting region from the second plotting region using exclusive OR operation, in the fourth and sixth steps.

9. The nail region detection method according to claim 2, wherein the ratio between the physical quantities in the second plotting region is the ratio between the area of the dense region with dense pixels after performing the processing for smoothing the second plotting region, and the area of the coarse region obtained by removing the dense region from the second plotting region, in the fourth and sixth steps.

10. The nail region detection method according to claim 2, wherein the physical quantity or its ratio in the second plotting region is the number of pixels, in the fourth and sixth steps.

11. The nail region detection method according to claim 10, wherein the number of pixels in the second plotting region is the number of pixels of the image in the dense region with dense pixels after performing the processing for smoothing the second plotting region, in the fourth and sixth steps.

12. The nail region detection method according to claim 10, wherein the number of pixels in the second plotting region is the number of pixels in the coarse region obtained by removing the dense region with dense pixels after performing the processing for smoothing the second plotting region from the second plotting region using exclusive OR operation, in the fourth and sixth steps.

13. The nail region detection method according to claim 2, wherein the ratio between the physical quantities in the second plotting region is the ratio between the number of pixels of the image in the dense region with dense pixels after performing the processing for smoothing the second plotting region, and the number of pixels of the image in the coarse region obtained by removing the dense region from the second plotting region, in the fourth and sixth steps.

14. The nail region detection method according to claim 2, wherein the first graph is a two-dimensional planar graph using two of the three axes for the three kinds of physical quantities, in the first step.

15. The nail region detection method according to claim 2, wherein the predetermined colour specification system contains at least a hue component in the first step.

16. The nail region detection method according to claim 2, wherein one axis, along which the threshold value is varied, is the hue component in the second step.

17. The nail region detection method according to claim 2, wherein the initial value for the threshold along the one axis is set to the value on the outside of one of the maximum value or the minimum value by obtaining at least one of the maximum value or the minimum value along the one axis from the first plotting region, in the second step.

18. The nail region detection method according to claim 2, wherein the second plotting region is zoned by repeating expansion and degeneration operations thereon, in the fourth step.

19. The nail region detection method according to claim 2, wherein the ratio between the physical quantities in the second plotting region is the ratio between a first size along the long axis, which is a maximum length size along the axis, and a second size along the short axis, which is the minimum length size along the axis, in the fourth and sixth steps.

20. The nail region detection method according to claim 2, wherein the ratio between the physical quantities in the second plotting region is the ratio, first size/(first size+second size), between a first size along the long axis, which is a maximum length size along the axis, and a second size along the short axis, which is the minimum length size along the axis, in the fourth and sixth steps.

21. The nail region detection method according to claim 2, wherein the predetermined colour specification system is a HLS colour specification system composed of hue, saturation, and luminance components in the first step.

22. A computer program product comprising at least one non-transitory computer-readable medium containing a program which, when executed, causes a computer to perform the steps according to claim 1.

23. A computer program product comprising at least one non-transitory computer-readable medium containing a program which, when executed, causes a computer to perform the steps according to claim 21.

24. A nail region detection device for detecting the nail region from the hand image comprising at least:
a colour camera for capturing a colour image containing the user's hand; and
a non-transitory computer program storage medium having data stored therein representing software executable by a computer, the software comprising:
program instructions for processing the image data output from the colour camera;
a program which, when executed, causes a computer to perform the steps according to claim 21.

25. A nail region detection device for detecting the nail region from the hand image comprising:
a colour camera for capturing a colour image containing the user's hand;
an image data storage medium for storing data on the image containing the user's hand captured by the colour camera;
a non-transitory computer program storage medium having data stored therein representing software executable by a computer, the software comprising:
program instructions for converting the data items on the captured image from the colour specification program instructions used by the colour camera to the predetermined colour specification program instructions, which is represented by three axes for three kinds of physical quantities and is different from the colour specification program instructions used by the colour camera, and plotting them in a first graph;
program instructions for setting a threshold value along one of the three axes and parallel to other axes with respect to more than one first plotting region, in which the data items converted to the predetermined colour specification and plotted in the first region are distributed, and then varying the threshold value in the direction traversing the first plotting region;
program instructions for replotting only the plotting data item equal to or greater than the threshold value along the one axis in a second graph in a two-dimensional plane orthogonally intersecting the one axis at the threshold value to form the second plotting region;
program instructions for detecting at least one physical quantity or its ratio in a plurality of the second plotting regions in the second graph;
program instructions for replotting on the plotting data items equal to or greater than the threshold value in the second plotting region in the second graph while varying the threshold value along the one axis in the direction traversing the first plotting region, and repeating the processing for detecting the physical quantity or its ratio in a plurality of the second plotting regions in the second graph; and
program instructions for detecting the amount of variation in physical quantity or its ratio in the second plotting region obtained for each threshold value and determining, as the nail region, the second plotting region, in which the gradient of the amount of variation is equal to or less than the predetermined value.

26. A nail region detection device for detecting a nail region from a hand image comprising at least:
controller for repeating, several times, the processing for mapping the first plotting region, in which the data items on the hand image captured by the colour camera has been plotted and converted in the three-dimensional colour spatial first graph, to the two-dimensional planar second plotting region while varying the threshold value in line with the value along the one axis in the three-dimensional colour space; and the nail detection system including at least a controller for detecting at least one physical quantity or its ratio in the two-dimensional planar second plotting region at each of the steps; and a nail determination part for determining, as the nail region, the second plotting region, in which the gradient of the amount of variation in the physical quantity or its ratio in the second plotting region between the steps is equal to or less than the predetermined value.

27. A system that comprises at least one computer for processing the various steps in the nail region detection method according to claim 2.

* * * * *